United States Patent
Suh et al.

(10) Patent No.: US 9,288,469 B2
(45) Date of Patent: Mar. 15, 2016

(54) DIGITAL BROADCAST RECEIVING METHOD PROVIDING TWO-DIMENSIONAL IMAGE AND 3D IMAGE INTEGRATION SERVICE, AND DIGITAL BROADCAST RECEIVING DEVICE USING THE SAME

(71) Applicant: LG Electronics Inc., Seoul (KR)

(72) Inventors: Jongyeul Suh, Seoul (KR); Jinpil Kim, Seoul (KR); Jaehyung Song, Seoul (KR); Hotaek Hong, Seoul (KR); Joonhui Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 226 days.

(21) Appl. No.: 13/778,855

(22) Filed: Feb. 27, 2013

(65) Prior Publication Data
US 2013/0307925 A1    Nov. 21, 2013

Related U.S. Application Data

(63) Continuation of application No. 13/142,187, filed as application No. PCT/KR2009/003733 on Jul. 8, 2009.

(60) Provisional application No. 61/141,244, filed on Dec. 30, 2008.

(51) Int. Cl.
*H04N 13/00* (2006.01)
*H04N 21/434* (2011.01)
(Continued)

(52) U.S. Cl.
CPC ............ *H04N 13/0048* (2013.01); *H04N 5/46* (2013.01); *H04N 13/0059* (2013.01); *H04N 21/2362* (2013.01); *H04N 21/434* (2013.01); *H04N 21/4345* (2013.01)

(58) Field of Classification Search
None
See application file for complete search history.

(56) References Cited

U.S. PATENT DOCUMENTS 5,612,753 A * 3/1997 Poradish et al. ............. 348/743
5,619,256 A * 4/1997 Haskell et al. ................ 348/43
(Continued)

FOREIGN PATENT DOCUMENTS

CN 1507277 6/2004
CN 1540983 10/2004
(Continued)

OTHER PUBLICATIONS

Jiang Xiuhua, "Service Information in Digital Television Broadcasting," Journal of Beijing Broadcasting Institute (Science and Technology); Jun. 30, 2002; vol. 9, Issue 2, pp. 36-45.
(Continued)

*Primary Examiner* — Jay Patel
*Assistant Examiner* — Reza Aghevli
(74) *Attorney, Agent, or Firm* — Dentons US LLP

(57) ABSTRACT

A digital broadcast receiving apparatus for providing an integrated service of a 2D image and a 3D image. The apparatus comprising a demultiplexing unit configured to demultiplex a received digital broadcast signal; a PSIP or PSI/SI processor configured to extract at least any one of 3D service information related to a 2D image channel or service and 2D service information related to a 3D image channel or service from the demultiplexed digital broadcast signal; a decoder configured to decode an extension view video stream and a base view video stream from the demultiplexed digital broadcast signal; and an output formatting unit configured to format the extension view video stream and the base view video stream based on at least any one of the 3D service information and the 2D service information.

9 Claims, 16 Drawing Sheets

(51) Int. Cl.
*H04N 5/46* (2006.01)
*H04N 21/2362* (2011.01)

(56) References Cited

U.S. PATENT DOCUMENTS

| | | | |
|---|---|---|---|
| 6,462,786 | B1 | 10/2002 | Glen et al. |
| 6,567,984 | B1 | 5/2003 | Allport |
| 7,227,583 | B2 | 6/2007 | Sin |
| 8,045,588 | B2 * | 10/2011 | Lee et al. ............. 370/475 |
| 8,289,998 | B2 | 10/2012 | Kim et al. |
| 8,488,949 | B2 | 7/2013 | Nakashika et al. |
| 8,645,991 | B2 * | 2/2014 | McIntire et al. ............. 725/34 |
| 2002/0009137 | A1 * | 1/2002 | Nelson et al. ............. 375/240.1 |
| 2004/0114052 | A1 | 6/2004 | Sin |
| 2007/0008575 | A1 * | 1/2007 | Yu et al. ............. 358/1.15 |
| 2007/0035707 | A1 * | 2/2007 | Margulis ............. 353/122 |
| 2007/0165676 | A1 | 7/2007 | Kato |
| 2007/0250901 | A1 | 10/2007 | McIntire et al. |
| 2008/0143823 | A1 | 6/2008 | Jin |
| 2008/0310499 | A1 | 12/2008 | Kim |
| 2010/0110162 | A1 | 5/2010 | Yun et al. |
| 2014/0118490 | A1 | 5/2014 | Suh et al. |

FOREIGN PATENT DOCUMENTS

| | | |
|---|---|---|
| CN | 1954606 | 4/2007 |
| CN | 101606388 | 12/2009 |
| EP | 1463340 | 9/2004 |
| EP | 1501317 A1 | 1/2005 |
| EP | 1617684 A1 | 1/2006 |
| JP | 10-2007-013994 A | 1/2007 |
| JP | 2007-13994 | 1/2007 |
| KR | 10-2004-0051475 A | 6/2004 |
| KR | 10-2006-0054872 A | 5/2006 |
| KR | 1020060127308 A | 12/2006 |
| KR | 10-0697972 | 3/2007 |
| KR | 10-2007-0058302 A | 6/2007 |
| KR | 10-2008-0030360 A | 4/2008 |
| KR | 10-2008-0051086 | 6/2008 |
| KR | 1020100086440 A | 7/2010 |
| WO | WO 2005/114998 | 12/2005 |
| WO | 2007064159 | 6/2007 |
| WO | WO 2008/070133 A2 | 6/2008 |

OTHER PUBLICATIONS

Lim, JeongEun et al., "A Multiview Sequence CODEC with view scalability", Signal Processing Image Communication, Mar. 1, 2004, pp. 239-256, vol. 19, No. 3, Science Direct.

* cited by examiner

FIG. 1

| Syntax | No. of bits | Format |
|---|---|---|
| extended_service_descriptor ( ) { | | |
|     descriptor_tag | 8 | 0xTBD |
|     descriptor_length | 8 | uimsbf |
|     number_extended_channels | 8 | uimsbf |
|     for (j=0; j < number_extended_elements; j++) { | | |
|         extended_service_type | 8 | uimsbf |
|         reserved | 4 | '1111' |
|         ext_major_channel_number | 10 | uimsbf |
|         ext_minor_channel_number | 10 | uimsbf |
|         ext_source_id | 16 | uimsbf |
|         ext_channel_TSID | 16 | uimsbf |
|         ext_program_number | 16 | uimsbf |
|     } | | |
| } | | |

FIG. 2

| Syntax | No. of bits | Format |
|---|---|---|
| 3D_service_location_descriptor ( ) { | | |
|     descriptor_tag | 8 | 0xTBD |
|     descriptor_length | 8 | uimsbf |
|     reserved | 3 | '111' |
|     PCR_PID | 13 | uimsbf |
|     reserved | 1 | '1' |
|     number_of_views | 7 | uimsbf |
|     for (j=0; j<number_of_views; j++) { | | |
|         stream_type | 8 | uimsbf |
|         reserved | 1 | '1' |
|         priority_id | 7 | uimsbf |
|         reserved | 3 | '111' |
|         elementary_PID | 13 | uimsbf |
|         left_right_flag | 1 | uimsbf |
|         if (number_of_extended_views > 1) { | | |
|             view_position | 7 | uimsbf |
|         } | | |
|         else { | | |
|             reserved | 7 | '111111' |
|         } | | |
| } | | |

FIG. 11

| Syntax | No. of bits | Format |
|---|---|---|
| 3D_service_location_descriptor ( ) { | | |
|     descriptor_tag | 8 | 0xBB |
|     descriptor_length | 8 | uimsbf |
|     reserved | 3 | '1111' |
|     PCR_PID | 13 | uimsbf |
|     reserved | 4 | '111' |
|     base_view_major_channel_number | 10 | uimsbf |
|     base_view_minor_channel_number | 10 | uimsbf |
|     base_view_source_id | 16 | uimsbf |
|     base_view_channel_TSID | 16 | uimsbf |
|     base_view_program_number | 16 | uimsbf |
|     reserved | 1 | '1' |
|     number_of_views | 7 | uimsbf |
|     for (j=0; j < number_of_views; j++) { | | |
|         stream_type | 8 | uimsbf |
|         format_identifier | 32 | uimsbf |
|         length_of_details | 8 | uimsbf |
|         stream_info_details ( ) { | | |
|             extended_service_type | 8 | uimsbf |
|             reserved | 3 | uimsbf |
|             elementary_PID | 13 | uimsbf |
|             reserved | 1 | '1' |
|             priority_id | 7 | uimsbf |
|             left_right_flag | 1 | bslbf |
|             view_position | 7 | uimsbf |
|         } | | |
|     } | | |
| } | | |

FIG. 12

| Syntax | No. of Bits | Format |
|---|---|---|
| terrestrial_virtual_channel_table_section() { | | |
|   table_id | 8 | 0xC8 |
|   section_syntax_indicator | 1 | '1' |
|   private_indicator | 1 | '1' |
|   reserved | 2 | '11' |
|   section_length | 12 | uimsbf |
|   transport_stream_id | 16 | uimsbf |
|   reserved | 2 | '11' |
|   version_number | 5 | uimsbf |
|   current_next_indicator | 1 | bslbf |
|   section_number | 8 | uimsbf |
|   last_section_number | 8 | uimsbf |
|   protocol_version | 8 | uimsbf |
|   num_channels_in_section | 8 | uimsbf |
|   for (i=0; i<num_channels_in_section; i++) { | | |
|     short_name | 7*16 | uimsbf |
|     reserved | 4 | '1111' |
|     major_channel_number | 10 | uimsbf |
|     minor_channel_number | 10 | uimsbf |
|     modulation_mode | 8 | uimsbf |
|     carrier_frequency | 32 | uimsbf |
|     channel_TSID | 16 | uimsbf |
|     program_number | 16 | uimsbf |
|     ETM_location | 2 | uimsbf |
|     access_controlled | 1 | bslbf |
|     hidden | 1 | bslbf |
|     reserved | 2 | '11' |
|     hide_guide | 1 | bslbf |
|     reserved | 3 | '111' |
|     service_type | 6 | uimsbf |
|     source_id | 16 | uimsbf |
|     reserved | 6 | '111111' |
|     descriptors_length | 10 | uimsbf |
|     for (i=0; i<N; i++) { | | |
|       descriptor() | | |
|     } | | |
|   } | | |
|   reserved | 6 | '111111' |
|   additional_descriptors_length | 10 | uimsbf |
|   for (j=0; j<N; j++) { | | |
|     additional_descriptor() | | |
|   } | | |
|   CRC_32 | 32 | rpchof |
| } | | |

| Syntax | Value |
|---|---|
| number_channels_in_section | 3 | i = 0 → signaling channel 12-1 (the same as that of related art)

i = 1 → signaling channel 12-2
3D service location descriptor is used

| =1 (Channel 12-2 signaling) | |
|---|---|
| major_channel_number | 12 |
| minor_channel_number | 2 |
| base_view_major_channel_num | 12 |
| base_view_minor_channel_num | 1 |
| service_type, number_of_views | 3D_Stereoscopic |

| Base View description (j=0) | |
|---|---|
| stream_type | 0x1B (AVC) |
| priority_id | 0 |
| left_right_flag | - |
| view_position | - |
| elementary_PID | 0x0200 |

| Extended View #1 description (j=1) | |
|---|---|
| stream_type | 0x20 (MVC) |
| priority_id | 1 |
| left_right_flag | 1 |
| view_position | 0 |
| elementary_PID | 0x0300 |

FIG. 13

| Syntax | No. of Bits | Format |
|---|---|---|
| terrestrial_virtual_channel_table_section() { | | |
|   table_id | 8 | 0xC8 |
|   section_syntax_indicator | 1 | '1' |
|   private_indicator | 1 | '1' |
|   reserved | 2 | '11' |
|   section_length | 12 | uimsbf |
|   transport_stream_id | 16 | uimsbf |
|   reserved | 2 | '11' |
|   version_number | 5 | uimsbf |
|   current_next_indicator | 1 | bslbf |
|   section_number | 8 | uimsbf |
|   last_section_number | 8 | uimsbf |
|   protocol_version | 8 | uimsbf |
|   num_channels_in_section | 8 | uimsbf |
|   for (i=0; i< num_channels_in_section; i++) { | | |
|     short_name | 7*16 | uimsbf |
|     reserved | 4 | '1111' |
|     major_channel_number | 10 | uimsbf |
|     minor_channel_number | 10 | uimsbf |
|     modulation_mode | 8 | uimsbf |
|     carrier_frequency | 32 | uimsbf |
|     channel_TSID | 16 | uimsbf |
|     program_number | 16 | uimsbf |
|     ETM_location | 2 | uimsbf |
|     access_controlled | 1 | bslbf |
|     hidden | 1 | bslbf |
|     reserved | 2 | '11' |
|     hide_guide | 1 | bslbf |
|     reserved | 3 | '111' |
|     service_type | 6 | uimsbf |
|     source_id | 16 | uimsbf |
|     reserved | 6 | '111111' |
|     descriptors_length | 10 | uimsbf |
|     for (i=0; i<N; i++) { | | |
|       descriptor() | | |
|     } | | |
|   } | | |
|   reserved | 6 | '111111' |
|   additional_descriptors_length | 10 | uimsbf |
|   for (j=0; j<N; j++) { | | |
|     additional_descriptor() | | |
|   } | | |
|   CRC_32 | 32 | rpchof |
| } | | | i =2 → signaling channel 12-3
3D service location description is used
Extended view #0 along with content when i=1
Add content with respect to extended view #2

| i=2 (Channel 12-3 signaling) | |
|---|---|
| major_channel_number | 12 |
| minor_channel_number | 3 |
| base_view_major_channel_num | 12 |
| base_view_minor_channel_num | 1 |
| service_type, number_of_views | 3D_Multiview (4 views) |

| Base View description (j=0) | |
|---|---|
| stream_type | 0x1B (AVC) |
| priority_id | 0 |
| left_right_flag | - |
| view_position | - |
| elementary_PID | 0x0200 |

| Extended View #1 description (j=1) | |
|---|---|
| stream_type | 0x20 (MVC) |
| priority_id | 1 |
| left_right_flag | 1 |
| view_position | 0 |
| elementary_PID | 0x0300 |

| Extended View #0 description (j=2) | |
|---|---|
| stream_type | 0x20 (MVC) |
| priority_id | 2 |
| left_right_flag | 0 |
| view_position | 0 |
| elementary_PID | 0x0301 |

| Extended View #2 description (j=3) | |
|---|---|
| stream_type | 0x20 (MVC) |
| priority_id | 3 |
| left_right_flag | 1 |
| view_position | 1 |
| elementary_PID | 0x0302 |

DIGITAL BROADCAST RECEIVING METHOD PROVIDING TWO-DIMENSIONAL IMAGE AND 3D IMAGE INTEGRATION SERVICE, AND DIGITAL BROADCAST RECEIVING DEVICE USING THE SAME

This application is a continuation of prior application Ser. No. 13/142,187 filed Jun. 24, 2011, which claims the benefit of U.S. Provisional Application No. 61/141,244, filed on Dec. 30, 2008 and PCT Application No. PCT/KR2009/003733 filed on Jul. 8, 2009, all of which are hereby incorporated by reference in their entirety.

TECHNICAL FIELD

The present invention relates to a digital broadcast receiving method and apparatus and, more particularly, to a digital broadcast receiving method for providing a 3D image service and a digital broadcast receiving apparatus using the same.

BACKGROUND ART

Recently, as the interest in stereoscopic image services is growing, devices for providing stereoscopic images continue to be developed. Among the schemes for implementing such stereoscopic images is a stereoscopic scheme.

A basic principle of the stereoscopic scheme is that images arranged to be perpendicular to the left and right eyes of a person (or a user) are separately input and each image respectively input to the left and right eyes are combined in the user's brain to generate a stereoscopic image. In this case, the arrangement of the images such that they are perpendicular means that the respective images do not interfere with each other.

Methods for preventing interference include a polarization scheme, a time-sequential scheme, and a spectral scheme.

First, the polarization scheme is to separate respective images by using a polarization filter. Namely, the polarization filter perpendicular to an image for the left eye and an image for the right eye is employed to allow different images filtered by the polarization filter to be input to the left and right visual fields. The time-division scheme is that left and right images are alternately displayed and active glasses worn by the user is synchronized with the alternately displayed images to thus separate the respective images. Namely, when the images are alternately displayed, the shutter of the synchronized active glasses opens only the visual field to which a corresponding image is to be input and blocks the other visual field to separately input the left and right images.

The spectral scheme projects left and right images through a spectral filter having a spectrum band in which RGB spectrums do not overlap with each other. With respect to the thusly projected left and right images, the user wears passive glasses including a spectral filter passing through only a spectral area set for the left and right images, thus separately receiving the left and right images.

However, the related art digital broadcast is based on two-dimensional (2D) images. For example, a PSIP (Program and System Information Protocol) used in the ATSC (Advanced Television Systems Committee) type digital broadcast is targeted only for a 2D image service.

Also, although a 3D image service is provided, it is separately provided from the existing 2D image service, and an integrated image service by associating the existing 2D image service and the 3D image service has not been presented yet.

Thus, even if a 3D image service related to the existing 2D image service is provided through a certain channel, users cannot know about that unless they check them in advance through program guide information, or the like. Also, another problem arises in that a user, who is being provided with a 3D image service, cannot quickly change to the 2D image service when he wants.

For these reasons, although a user wants to utilize the 3D image service, he cannot properly utilize the 3D image service.

Thus, in case a 3D image service with respect to a 2D image service is provided to a channel through which the existing 2D image service is being provided, it is required to signal a channel providing the 3D images related to the 2D image channel. Also, when the 3D image service is being provided, connection information regarding the 2D image service and the 3D image service is required to be provided by signaling the channel providing the 2D images with respect to the corresponding 3D image service.

In addition, a digital broadcast receiving apparatus is required to be configured to properly check and process such signaling.

However, a method for providing an integrated image service to users by connecting a 2D image service and a 3D image service is yet to be implemented.

DISCLOSURE OF THE INVENTION

Therefore, an object of the present invention is to provide a digital broadcast receiving method and apparatus capable of providing signaling for a channel providing a 3D image related to a 2D image when a 3D image service related to a 2D image service is being provided.

Another object of the present invention is to provide a digital broadcast receiving method and apparatus capable of providing signaling for a channel providing a 2D image with respect to a corresponding 3D image, when a 3D image service is being provided.

Another object of the present invention is to provide a digital broadcast receiving method and apparatus capable of providing signaling for a 3D image signal related to a 2D image channel and also signaling a 2D image channel related to a 3D image channel to thus provide an integrated service with respect to a 2D image and a 3D image to a user.

Another object of the present invention is to provide a digital broadcast receiving method and apparatus capable of providing an integrated service with respect to a 2D image and a 3D image to a user, thus improving user convenience with respect to a 3D image service.

To achieve these and other advantages and in accordance with the purpose of the present invention, as embodied and broadly described herein, there is provided a digital broadcast receiving apparatus for providing an integrated service of a 2D image and a 3D image, including: a demultiplexing unit configured to demultiplex a received digital broadcast signal; a PSIP or PSI/SI processor configured to extract at least any one of 3D service information related to a 2D image channel or service, and 2D service information related to a 3D image channel or service from the demultiplexed digital broadcast signal; a decoder configured to decode an extension view video stream and a base view video stream from the demultiplexed digital broadcast signal; and an output formatting unit configured to format the extension view video stream and the base view video stream based on at least any one of the 3D service information and the 2D service information.

When a selection of the 3D image service is input by a user, a 3D image channel or service providing a 3D image with respect to the 2D image channel or service based on the 3D service information may be selected, and when a selection of the 2D image service is input by the user, a 2D image channel or service providing a 2D image with respect to the 3D image channel or service based on the 2D service information may be selected.

To achieve these and other advantages and in accordance with the purpose of the present invention, as embodied and broadly described herein, there is also provided a digital broadcast receiving method for providing an integrated service of a 2D image and a 3D image, including: a first step of receiving a digital broadcast signal and demultiplexing the received digital broadcast signal; a second step of extracting at least any one of 3D service information related to a 2D image channel or service, and 2D service information related to a 3D image channel or service from the demultiplexed digital broadcast signal; a third step of decoding an extension view video stream and a base view video stream from the demultiplexed digital broadcast signal; and a fourth step of formatting the extension view video stream and the base view video stream based on at least any one of the 3D service information and the 2D service information and displaying the formatted video streams.

In the method and apparatus for receiving a digital broadcast according to exemplary embodiments of the present invention, when a 3D image service related to a 2D image service is being provided, a channel providing a 3D image related to a 2D image channel can be signaled or provided.

Also, in the method and apparatus for receiving a digital broadcast according to exemplary embodiments of the present invention, when a 3D image service is being provided, a channel providing a 2D image with respect to a corresponding 3D image can be signaled or provided.

In addition, in the method and apparatus for receiving a digital broadcast according to exemplary embodiments of the present invention, a 3D image channel related to a 2D image channel is signaled and a 2D image channel related to a 3D image channel is also signaled, whereby an integrated service with respect to the 2D image and the 3D image can be provided to a user.

Moreover, in the method and apparatus for receiving a digital broadcast according to exemplary embodiments of the present invention, since an integrated service with respect to a 2D image and a 3D image is provided, user convenience with respect to the 3D image service can be improved.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIG. 1 shows an extended service descriptor providing information regarding a 3D image channel related to a 2D image channel through a TVCT (Terrestrial Virtual Channel Table) of a PSIP (Program and System Information Protocol) according to an exemplary embodiment of the present invention;

FIG. 2 shows a 3D service location descriptor providing information regarding a 3D image channel providing a 3D image service related to a 2D image in the TVCT (Terrestrial Virtual Channel Table) of the PSIP (Program and System Information Protocol) according to an exemplary embodiment of the present invention;

FIG. 11 is a view showing a 3D service location descriptor providing information regarding a 2D image channel related to a 3D image channel through the TVCT of the PSIP according to an exemplary embodiment of the present invention;

FIGS. 12 and 13 show examples of constituting the TVCT of the PSIP including the descriptor of FIG. 11;

MODES FOR CARRYING OUT THE PREFERRED EMBODIMENTS

Figure 3:
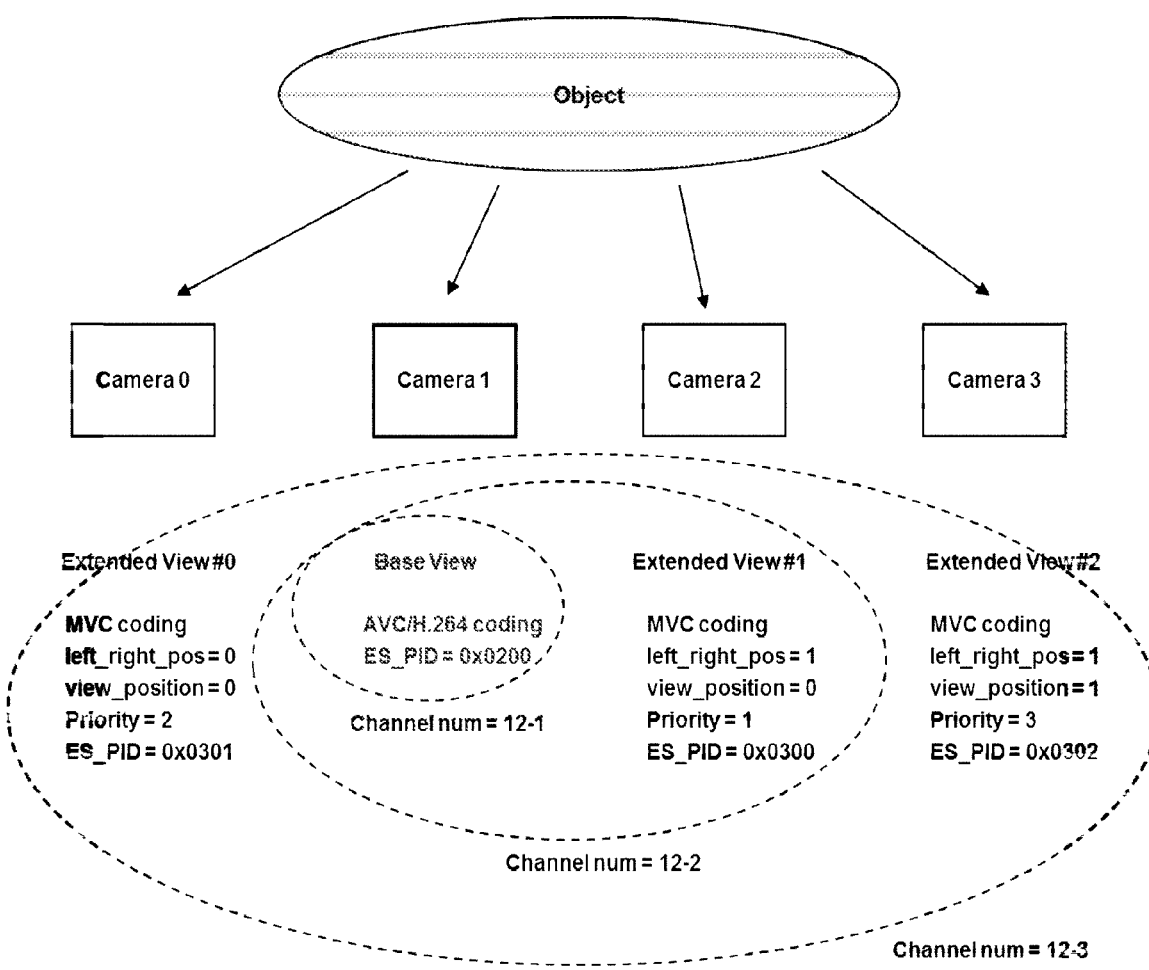
FIG. 3 shows field values of a set descriptor and how a virtual channel is configured according to an exemplary embodiment of the present invention.

The term of 3-D or 3D is used to describe a visual expression or display technique for reproducing a 3D video having an illusion effect of depth. As for a left eye image and a right eye image, the visual cortex of an observer (or a user) interprets the two images as a single 3D image.

A 3D display technique employs 3D image processing and expressing techniques with respect to a device available for displaying 3D images. Optionally, the device available for displaying 3D images may use a special observation device in order to effectively provide 3D images to the observer.

The 3D image processing and expression techniques may include, for example, stereoscopic image/video capturing, multi-view/video capture capturing using a plurality of cameras, processing of a 2D image and depth information, and the like. Display devices for displaying a 3D image may include, for example, an LED (Liquid Crystal Display), a digital TV screen, a computer monitor, or the like, including appropriate hardware and/or software supporting 3D display techniques. Special observation devices may include, for example, specialized glasses, goggles, head gear, eyewear, and the like.

In detail, the 3D image display techniques may include an anaglyph stereoscopic image processing (which is generally used together with passive polarized glasses), alternate-frames sequencing (which is generally used together with active shutter glasses/head gear), an autostereoscopic display using a lenticular or barrier screen, and the like. Various concepts and features described hereinafter can be applicable to such a stereoscopic image display technique.

A 3D image display technique may use an optical device, which rotates or alternately operates, e.g., a segmented polarizer attached to a color filter wheel, and in this case, synchronization therebetween is required. Another 3D image display technique may use a digital light processor (DLP) based on a digital micromirror device (DMD) using a rotatable microscopic mirror disposed in a quadrangular arrangement corresponding to pixels of an image to be displayed.

Meanwhile, new standards related to a stereoscopic image rendering and display technique (in particular 3D TV) is currently being developed by various enterprises, consortiums, and organizations. For example, the new standards may include SMPTE (the Society of Motion Picture and Television Engineers), CEA (Consumer Electronics Association), 3d@Home consortium, ITU (International Telecommunication Union), and the like. Besides, other standardization groups such as DVB, BDA, ARIB, ATSC, DVD forum, IEC, etc. are participating. MPEG (Moving Picture Experts Group) is participating 3D image coding of a multiview image, a stereoscopic image, and a 2D image having depth information, and currently, a multiview video codec extension with respect to MPEG-4 AVC (advanced video coding) is under standardization. Stereoscopic image coding and stereoscopic distribution formatting are related with color shifting (anaglyph), pixel sub-sampling (side-by-side, checkerboard, quincunx, etc.), and enhanced video coding (2D+Delta, 2D+Metadata, 2D having depth information). Concepts and features described herein can be applicable to such standards.

In addition, at least a portion of the concepts and features of the invention described herein are related with a 3D image display technique explained in the aspect of image reproducing and display environment with respect to a digital image or a 3D TV. However, details thereof do not limit various features described herein and can be applicable to various other types of display techniques and devices. For example, 3D TV techniques can be applicable to Blu-Ray™ technology, console games, cable, IPTV transmissions, mobile phone contents delivery, and the like, as well as to TV broadcasts, and in this case, the 3D TV technique is required to be compatible with different types of TVs, a set-top box (STB), a Blu-Ray™ device (e.g., a Blu-Ray™ disk (BD) player), a DVD player, and a TV contents distributor.

Exemplary embodiments of the present invention will now be described in detail with reference to the accompanying drawings. The same reference numerals denote the same elements throughout the drawings.

In an exemplary embodiment of the present invention, an additional descriptor is applied to a 2D image channel broadcast via which a 2D image is broadcast to perform signaling on channel information providing a relevant 3D image service. Namely, in the present exemplary embodiment, connection relationship information regarding a 3D image channel related to a 2D image channel is obtained through an extended service descriptor in the 2D image channel. In this case, in the present exemplary embodiment, a 3D service location descriptor with respect to the 3D image is additionally applied also to the 3D image channel.

Also, in the present exemplary embodiment, an additional descriptor is applied to a 3D image channel via which a 3D image is broadcast, in order to perform signaling on the channel information providing a relevant 2D image service. Namely, in the present exemplary embodiment, connection relation information regarding a 2D image channel related to the 3D image channel is obtained through a 3D service location descriptor in the 3D image channel.

The present invention proposes the configuration of syntaxes and fields of the foregoing descriptors applied to a 2D image channel and a 3D image channel. Also, the present invention proposes a digital broadcast receiving apparatus capable of effectively checking and processing such descriptors.

Hereinafter, in an exemplary embodiment of the present invention, a method for performing signaling on information regarding a channel through which a 3D image service is provided by applying an additional descriptor to a 2D image channel through which a 2D image is broadcast will be first described. And then, in a different exemplary embodiment of the present invention, a method for signaling information regarding a channel through which a relevant 2D image service is being provided by applying additional descriptor to a 3D image channel through which a 3D image is broadcast will be described.

Currently, digital broadcast schemes may be divided into an ATSC (Advanced Television Systems Committee) scheme and a DVB (Digital Video Broadcasting) scheme. The ATSC scheme is largely used for digital broadcasts in North America and the DVB scheme is largely used in Europe.

First, the configuration of an extended service descriptor used to perform signaling on information regarding a 3D image channel related to a 2D image channel and a 3D service location descriptor will be described in detail.

FIGS. 1 and 2 show a case in which information regarding a 3D image channel related to a 2D image channel is provided through a TVCT (Terrestrial Virtual Channel Table) of a PSIP (Program and System Information Protocol) used in an ATSC type digital broadcast.

FIG. 1 shows an extended service descriptor providing information regarding a 3D image channel related to a 2D image channel through the TVCT (Terrestrial Virtual Channel Table) of the PSIP (Program and System Information Protocol) according to an exemplary embodiment of the present invention. The extended service (EV) descriptor of FIG. 1 is applied as an additional descriptor with respect to a 2D image channel to perform signaling on the information regarding the channel through which the 3D image service related to the 2D image channel is being provided.

Each field constituting the EV descriptor illustrated in FIG. 2 according to an exemplary embodiment of the present invention will now be described. For a simple and clear description of the present invention, English expressions of the fields constituting a syntax will be used as it is and discriminated by using double quotation marks.

"descriptor_tag" is a field for discriminating the descriptor, and has a value of 8 bits.

"descriptor_length" indicates the overall length of a following field by the number of bits, and has a value of 8 bits.

"number_extended_channels" indicates the number of virtual channels in use when a 3D image service with respect to a 2D image channel, a main channel, is provided, and has a value of 8 bits.

"extended_service_type" indicates a service type of a virtual channel used to provide the 3D image service, and has a value of 8 bits. In the present exemplary embodiment, whether a service provided by a corresponding virtual channel is a 3D stereoscopic video or a 3D multi-view video can be indicated by the value of this field.

The afore-mentioned video stream transmitted to implement a stereoscopic image includes data obtained by coding left and right view image sequences. In this case, one of the two images is a base view video and the other of the two images than the base view is called an extended view. In the present exemplary embodiment, the extended view video refers to a video stream of another view excluding the base view among the video streams.

"reserved" is a field which is not currently used in a system but is likely to be used in the future. It is filled with 0 according to the number of bits thereof until such is newly defined.

"ext_major_channel_number" indicates "major_channel_number" with respect to a virtual channel providing a 3D image service, and has a value of 10 bits. The "major_channel_number" indicates a major channel number related to a virtual channel and is used as a user reference number with respect to a corresponding virtual channel.

"ext_minor_channel_number" indicates a "minor_channel_number" with respect to the virtual channel providing the 3D image service, and has a value of 10 bits. The "minor_channel_number" is used together with the "major_channel_number" as channel numbers of two parts.

"ext_source_id" indicates a "source_id" with respect to the virtual channel providing the 3D image service, and has a value of 16 bits. The "source_id" indicates a programming source connected to the corresponding virtual channel, and in this case, the source refers to a particular source such as video, text, data, or audio.

"ext_channel_TSID" indicates "channel_TSID" with respect to the virtual channel providing the 3D image service, and has a value of 16 bits.

The "channel_TSID" designates an ID value of an MPEG-2 transport stream connected to an MPEG-2 transport stream as a reference of a virtual channel.

"ext_program_number" indicates "program_number" with respect to a virtual channel providing a 3D image service, and has a value of 16 bits. The "program_number" is to link a program number defined in the PAT (Program Association Table) and PMT (Program Map Table) of the MPEG-2 system to a virtual channel.

In this manner, in the present exemplary embodiment, information regarding the 3D image channel related to a corresponding 2D image channel can be provided via the TVCT (Terrestrial Virtual Channel Table) of the PSIP (Program and System Information Protocol) by using an extended service descriptor in the 2D image channel.

FIG. 2 is a view showing a 3D service location descriptor providing video stream information in a 3D image related to a 2D image channel through the TVCT (Terrestrial Virtual Channel Table) of the PSIP (Program and System Information Protocol) according to an exemplary embodiment of the present invention.

Namely, the 3D service location descriptor of FIG. 2 is applied as an additional descriptor with respect to a 3D image channel signaled by the extended service descriptor of FIG. 1, providing video stream information in the corresponding 3D image channel.

The fields constituting the 3D service location descriptor illustrated in FIG. 2 according to an exemplary embodiment of the present invention will now be described. A repeated description of the same fields will be omitted.

"PCR_PID" indicates a packet identifier (PID) of a packet including timing information of a program, and has a value of 13 bits.

"number of views" indicates the number of image streams which can be received through a corresponding channel, and has a value of 7 bits.

"stream_type" indicates the type of an elementary stream, and has a value of 8 bits. For example, when the value of "stream_type" is 0×20, it can be known that the corresponding elementary stream has been coded by an MVC (Multiview Video Codec).

"priority_id" provides information as to which of receivable 3D image channels is to be selected when a function for supporting a multiview image is limited, and has a value of 7 bits.

When the number of view streams is larger than that which can be output by the digital broadcast receiving apparatus, a virtual channel to be decoded and output can be determined by using the "priority_id". For example, in case of the digital broadcast receiving apparatus having a stereoscopic display function, image streams whose "priority_id" is 0 and 1 are selectively output.

As for the "priority_id", different values are granted to all the image streams, in order to prevent a repeated value from being generated. The value of "priority_id" with respect to a base view video stream is set to be 0. In a different exemplary embodiment, the "priority_id" may be omitted, and in this case, the priority of an image stream may be set to be determined in order in a 3D service location descriptor.

"elementary_PID" includes a PID (Packet Identifier) of an elementary stream, and has a value of 13 bits.

"left_right_flag" indicates whether or not the position of an extended view video stream is in a rightward direction or a leftward direction based on a base view, and has a value of 1 bit. When the position of the extended view video stream is in the leftward direction based on the base view, this field has a value of 0, and when the position of the extended view video stream is in the rightward direction based on the base view, this field has a value of 1.

For example, in case of a stereoscopic display, when "left_right_flag"=1, the extended view video stream is decoded and output to a right video plane in the stereoscopic display output and the base view video stream is output to a left video plane. In case of the base view video stream, this field is disregarded.

"view_position" is indicates by which of left cameras or right cameras in a horizontal direction based on the base view the extended view video stream has been captured, or to which of multi-view planes the extended view video stream is to be output. This field has a value of 7 bits. In case of a stereoscopic display, only two of the left and right video streams are used, so this field is not required to be used.

In the present exemplary embodiment, the position of the extended view video stream or a video plane to which the extended view video stream is to be output can be clearly designated by using the "left_right_flag" and the "view_position".

In this manner, in the present exemplary embodiment, since the 3D service location descriptor is additionally applied to the 3D image channel related to the 2D image channel, detailed video stream information with respect to the corresponding 3D image channel can be provided through the TVCT of the PSIP.

A method for setting major field values of the foregoing descriptors according to an exemplary embodiment of the present invention will now be described in more detail with reference to FIG. 3. Also, a method for setting video streams in a 2D image channel and a 3D image channel will be described.

FIG. 3 is a view for explaining field values of a set descriptor and how a virtual channel is configured according to an exemplary embodiment of the present invention.

Video streams are generated upon being captured by respective cameras, so each video stream has the same position information as that of a camera by which captured the corresponding video stream.

In FIG. 3, camera 1 is a camera of a base view, and in this case, a video stream from the camera of the base view is coded by a codec of MPEG-4 AVC/H.264. A packet identifier (ES_PID) of an elementary stream with respect to a video stream captured by the camera of the base view is set to be 0x0200.

Also, a channel number (channel num) of a 2D image channel providing the base view video stream is set to be 12-1 (namely, channel num=12-1).

Meanwhile, video streams captured by camera 0, camera 2, and camera 3 (excluding camera 1 of the base view) constitute extended vide video streams, all of which are coded by MVC (Multiview Video Codec).

In this case, a position value set for the camera 2 at the first position in the rightward direction of the camera 1 of the base view is "left_right_flag"=1 (rightward direction) and "view_position"=0 (first position). Also, "Priority_id" indicating priority of a video stream is set to be 1 and a packet identifier (ES_PID) of an elementary stream with respect to the extended view video stream captured by the camera 2 is set to be 0x0300.

A channel number of the 3D image channel providing the 3D image service with respect to the 2D image by using the reference view video stream and the extended view video stream captured by the camera 2 is set to be 12-2 (namely, channel num=12-2).

Thus, channel number 12-2, a first channel, providing the 3D image service related to channel number 12-2, a 2D image channel, has one extended view video stream, and in this case, the extended view video stream is output to the right video plane in the stereoscopic display output as described above.

Meanwhile, a position value set for the camera 0 at the first position in the leftward direction of the camera 1 of the base view is "left_right_flag"=0 (leftward direction) and "view_position"=0 (first position). Also, "Priority_id" indicating priority of a video stream is set to be 2 and a packet identifier (ES_PID) of an elementary stream with respect to the extended view video stream captured by the camera 0 is set to be 0x0301.

Also, a position value set for the camera 3 at the second position in the rightward direction of the camera 1 of the base view is "left_right_flag"=1 (rightward direction) and "view_position"=1 (second position). Also, "Priority_id" indicating priority of a video stream is set to be 3 and a packet identifier (ES_PID) of an elementary stream with respect to the extended view video stream captured by the camera 0 is set to be 0x0302.

A channel number (channel num) of a 3D image channel providing a 3D image service with respect to a 2D image by using the base view video stream and the extended view video streams captured by the camera 0, camera 2, and camera 3 is set to be 12-3 (namely, channel num=12-3).

Accordingly, the channel number 12-3 is a second channel providing the 3D image service related to the channel number 12-3, the 2D image channel, and the number of the extended view video streams is 3. Thus, the channel number 12-3 can provide a multi-view image.

Meanwhile, in the present exemplary embodiment, several extended view video streams are received via a single channel, but the present invention is not necessarily limited thereto and the respective extended view video streams may be received via a separately allocated channel.

Also, in the present exemplary embodiment, the physical channel number of the 2D image channel and that of the 3D image channel related to the 2D image channel are the same (namely, major_channel_number=12), but the present invention is not limited thereto and the physical channel number of the 3D image channel may be set to be different from that of the 2D image channel. Namely, for example, when the channel number of the 2D image channel is 12-1, the number of the 3D image channel related thereto may be set to be 13-2.

In this manner, appropriate position information may be set for the video streams generated by the respective cameras, and also, a 3D image channel providing a 3D image service related to a 2D image can be set.

Figure 4:
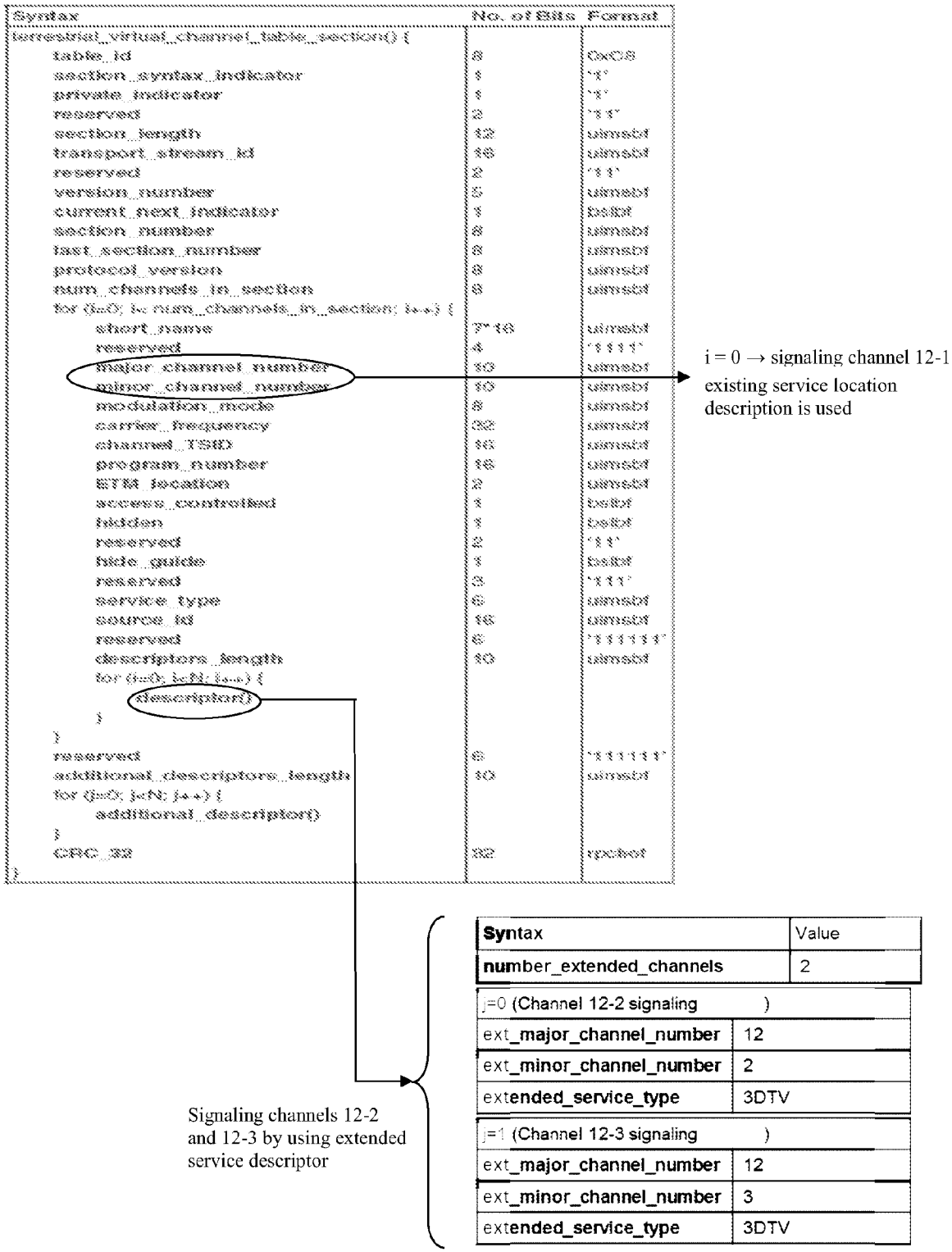
FIGS. 4 to 6 show examples of configuring the TVCT of the PSIP including the descriptor of FIGS. 1 and 2 according to an exemplary embodiment of the present invention.
Figure 5:
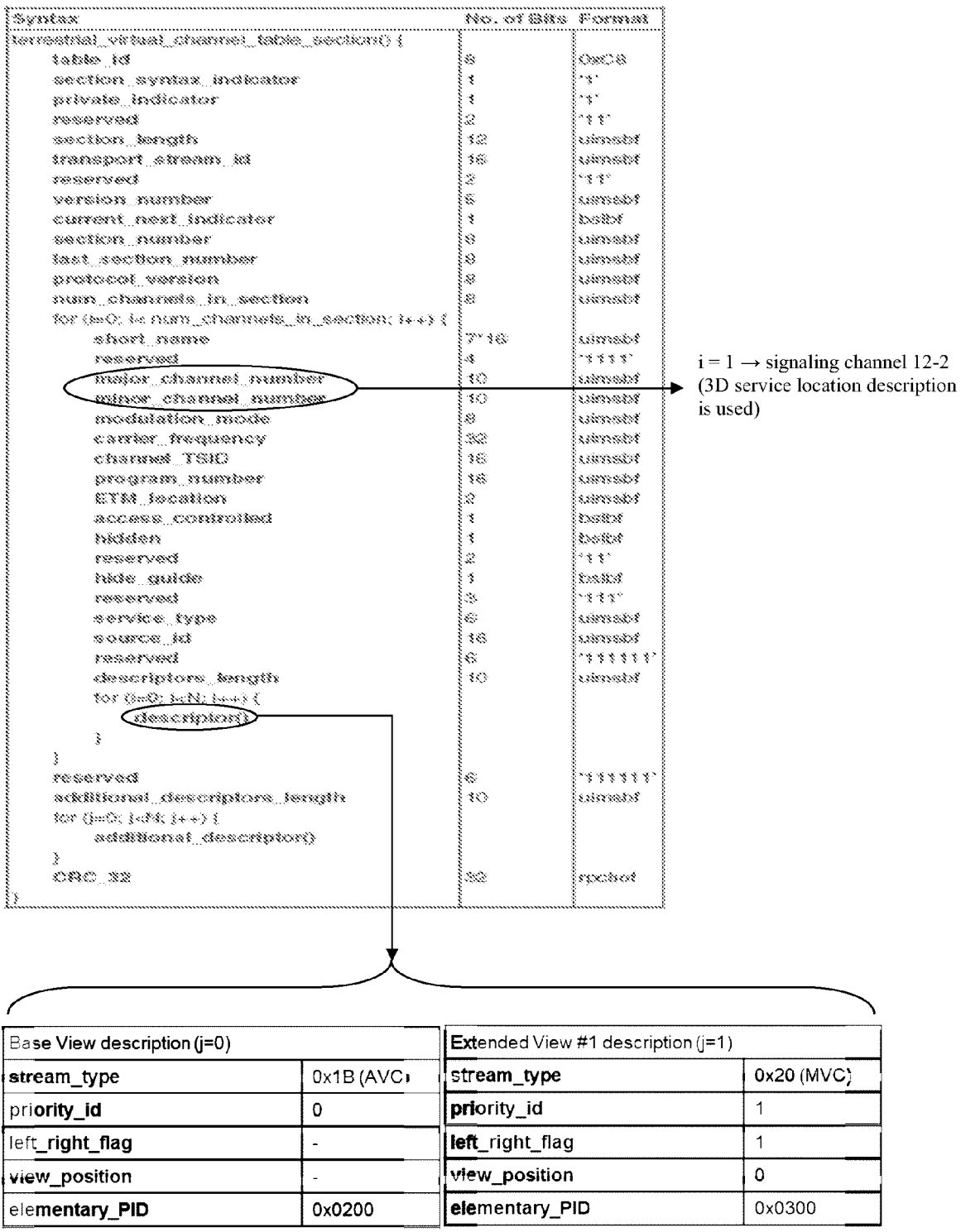
Figure 6:
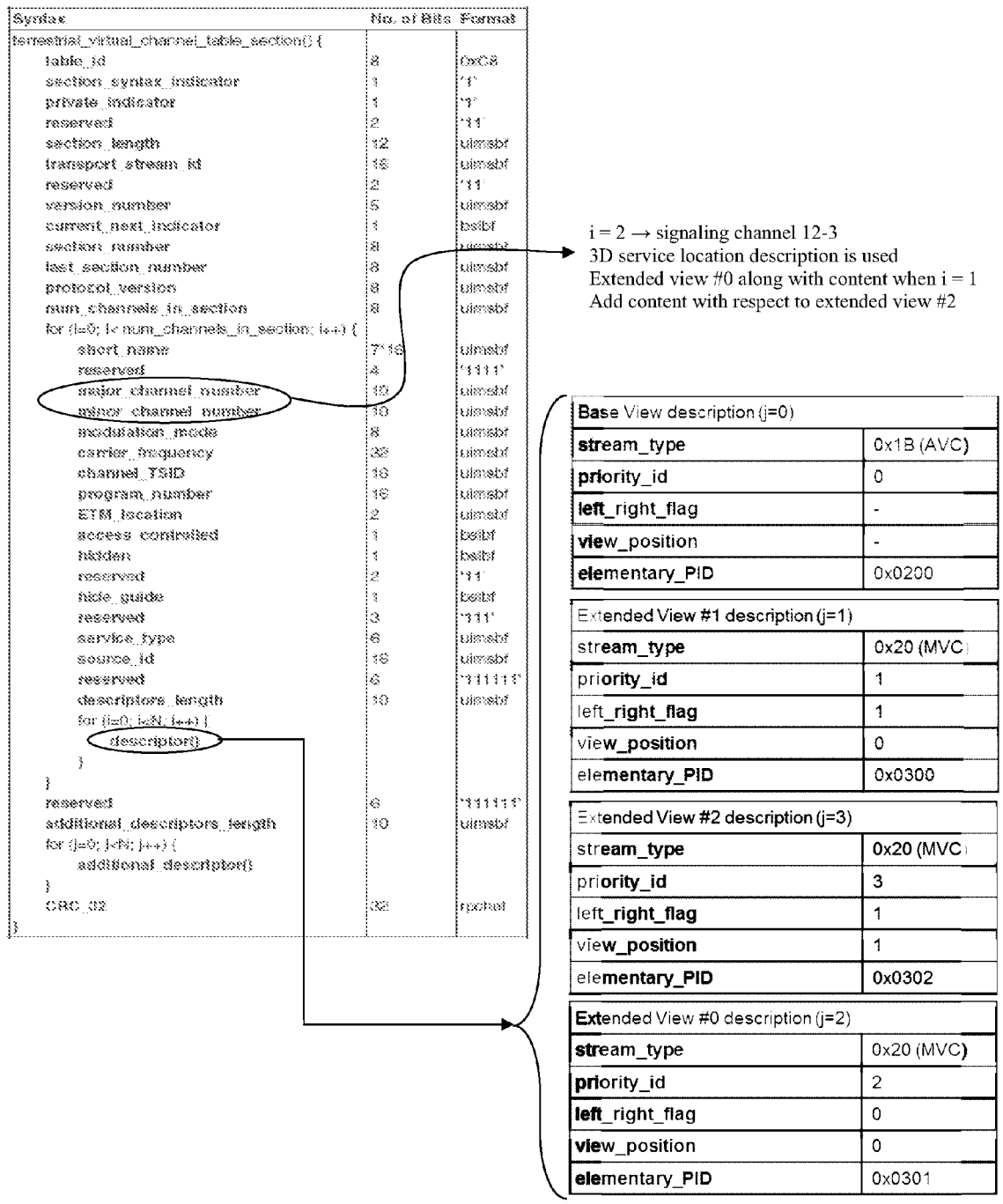

FIGS. 4 to 6 show examples of configuring the TVCT of the PSIP including the descriptors of FIGS. 1 and 2 according to an exemplary embodiment of the present invention.

As shown in FIG. 4, a service location descriptor for an existing 2D image service and an extended service descriptor providing information regarding a 3D image channel related thereto are included as descriptors with respect to the channel 12-3, which is a 2D image channel.

Also, as shown in FIGS. 5 and 6, a 3D service location descriptor providing information regarding a video stream is included for the channels 12-2 and 12-3, which are 3D image channels related to the 2D image channel 12-1.

Respective fields of the TVCT illustrated in FIGS. 4 to 6 will now be described. A description of the same fields which have been already described above will be omitted for the sake of brevity.

"table_id" indicates a table to which a corresponding section belongs, and has a value of 8 bits.

"section_syntax_indicator" indicates that a corresponding section is compatible with PSI (Program Specific Information) of MPEG-2 system standards, and has a value of 1 bit.

"private_indicator" indicates that a corresponding table is a private table of MPEG-2.

"reserved" is a field which is not currently used in a system but is likely to be used in the future. It is filled with 0 according to the number of bits thereof until such is newly defined.

"section_length" indicates, in units of bits/bytes, the length of the table that follows a corresponding field, and has a value of 12 bits.

"transport_stream_id" identifies a corresponding transport stream corresponding to each output when several multipliers exist in a network, and has a value of 16 bits.

"version_number" indicates the version when a corresponding table is created, and has a value of 5 bits. The version number is increased whenever content of the table is altered.

"current_next_indicator" indicates whether or not content of a corresponding table is to be currently applied or to be applied next time, and has a value of 1 bit.

"section_number" indicates the number of a corresponding section, and has a value of 8 bits.

"last_section_number" indicates "section_number" of the last section of a current table, and has a value of 8 bits.

"protocol_version" indicates the version of a protocol currently defined to be used, and has a value of 8 bits.

"num_channels_in_section" designates the number of the entire virtual channels existing in a TVCT section, and has a value of 8 bits.

"short name" is seven 16-bit character codes coded by UNICODE, and indicates the name of a virtual channel.

"major_channel_number" indicates a major channel number related to a virtual channel, which is used as a user reference number with respect to a corresponding virtual channel and has a 10-bit value.

"minor_channel_number" is used along with the "major_channel_number" so as to be used as channel numbers of two parts, and has a value of 10 bits.

"modulation_mode" indicates a modulation scheme with respect to a transmission carrier of a corresponding virtual channel, and has a value of 8 bits.

"carrier frequency" indicates a carrier frequency related to an analog/digital transmission of a virtual channel, and has a value of 32 bits.

"channel_TSID" designates an ID value of an MPEG-2 transport stream connected to an MPEG-2 transport stream used as the reference of a virtual channel, and has a value of 16 bits.

"program_number" is used to connect a program number defined in a PAT (Program Association Table) and a PMT (Program Map Table) of the MPEG-2 system, and has a value of 16 bits.

"ETM_location" indicates the presence of an ETT (Event Text Table) in a transmitted current channel or at a different position, and has a value of 2 bits.

"access_controlled" indicates whether or not accessing an event connected to a corresponding virtual channel is limited, and has a value of 1 bit.

"hidden" indicates whether a corresponding virtual channel can be directly accessed, and has a value of 1 bit.

"hidden_guide" indicates whether or not a corresponding virtual channel and events thereof are presented in an electronic program guide, and has a value of 1.

"service_type" discriminates whether or not the type of a service carried in a corresponding virtual channel is an analog or ATSC DTV (Digital Television)/audio/data, and has a value of 6 bits.

"source_id" indicates a programming source connected to a corresponding virtual channel, and has a value of 16 bits. Here, the source refers to a particular source such as video, text, data, or audio.

"descriptors_length" indicates the overall length of a descriptor of a corresponding virtual channel, and has a value of 10 bits.

"additional_descriptors_length" indicates the overall length of all the TVCT descriptors following a current field.

"CRC_32" indicates the value of a CRC (cyclic redundancy check) code used in the MPEG-2 system standard whose overall section is completed, and has a value of 32 bits. Whether or not a transmitted section has an error can be discovered by checking the CRC code.

FIG. 4 shows a case in which the value of a variable i is 0 (namely, i=0), in which signaling is performed on channel 12-1, a 2D image channel. The channel number 12-3, a 2D image channel, uses the existing service location descriptor for a 2D image, and signaling is performed on the related channels 12-2 and 12-3, 3D image channels, by using the extended service descriptor.

Meanwhile, FIG. 5 shows a case in which the value of the variable i is 1 (namely, i=1), in which signaling is performed on a channel 12-2, a first 3D image channel related to the 2D image channel. Namely, the channel 12-2, a 3D image channel, provides information regarding a base view video stream (namely, j=0) and an extended view video stream #1 (namely, j=1) by using the 3D service location descriptor.

FIG. 6 shows a case in which the value of the variable i is 2 (namely, i=2), in which signaling is performed in channel 12-3, a second 3D image channel related to the 2D image channel. Namely, the channel 12-3, a 3D image channel, provides information regarding a base view video stream (namely, j=0), the extended view video stream #1 (namely, j=1), the extended view video stream #0 (namely, j=2), and the extended view video stream #3 (namely, j=3) by using the 3D service location descriptor.

In this manner, the 3D image channel information related to the 2D image channel is provided through the TVCT (Terrestrial Virtual Channel Table) of the PSIP (Program and System Information Protocol) in the ATSC type digital broadcast.

So far, the method for providing the information regarding a 3D image channel related to a 2D image channel according to an exemplary embodiment of the present invention in the ATSC scheme, a digital broadcast scheme, which is largely used in North America has been described. Hereinafter, a method for providing information regarding a 3D image service related to a 2D image according to an exemplary embodiment of the present invention in the DVB scheme, a digital broadcast scheme, largely used in Europe will now be described.

Figure 7:
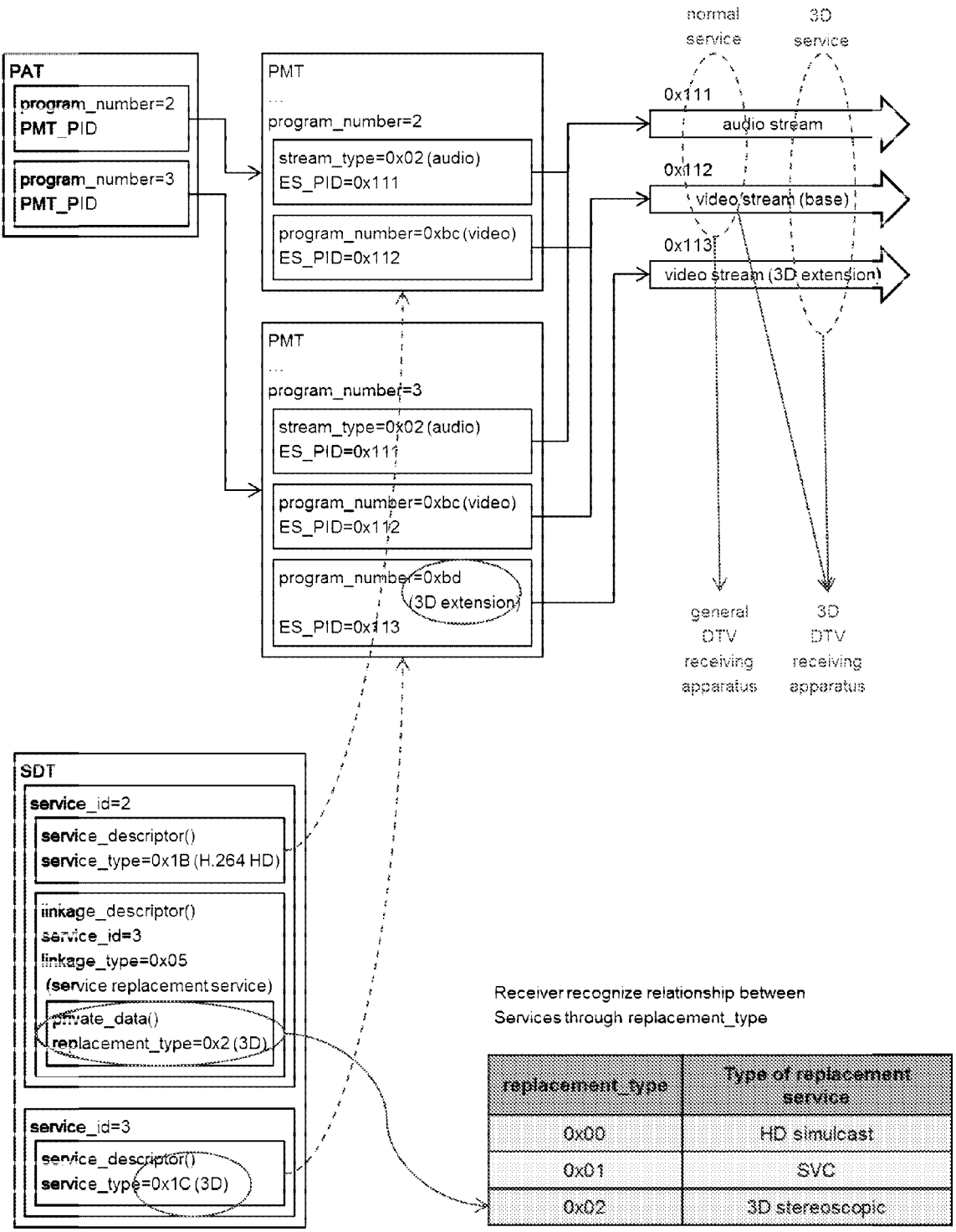
FIG. 7 shows a method for providing connection information regarding a 3D image service related to a 2D image through an SDT (Service Description Table) of SI (Service Information) and a PMT (Program Map Table) of PSI (Program Specific Information) used in a DVB (Digital Video Broadcasting) type digital broadcast.

FIG. 7 is a view showing a method for providing information regarding a 3D image service related to a 2D image through an SDT (Service Description Table) of SI (Service Information) and a PMT (Program Map Table) of PSI (Program Specific Information) used in a DVB (Digital Video Broadcasting) type digital broadcast.

In FIG. 7, a PAT (Program Association Table) is one of table information included in the PSI (Program Specific Information). Fields illustrated in FIG. 7 will now be described.

"program number" indicates a program for which "program_map_pid" is to be used in a transport stream, and has a value of 16 bits. For reference, the "program_map_pid" indicates a PID of a transport stream packet including a program map section which can be applicable to a program designated by the "program number".

"PMT_PID" indicates a PID value of a transport stream packet in which the PMT is included.

"stream_type" indicates the type of an elementary stream.

"ES_PID" indicates a PID of the elementary stream.

"service_id" is a number for discriminating a corresponding service from a different service in a transport stream.

"service_type" indicates the type of a service carried in a corresponding virtual channel. Here, when the value of the field is 0×1B (namely, "service_type"=0×1B), it means that a corresponding service is a high definition (HD) image which has been coded by H.264, and when the value of this field is 0×1C (namely, "service_type"=0×1C), it means that the corresponding service is a 3D image.

"linkage_type" indicates a linkage type in a specific manner. As shown in FIG. 7, when the value of this field is 0×05, it means that the linkage type is a service replacement service.

"replacement type" indicates a relation type between services. In the present exemplary embodiment, when the value of this field is 0×02, it means that the service relation type is a 3D stereoscopic type. Meanwhile, when the value of this field is 0×00, the service relation type is simulcasting of an HD image, and when the value of this field is 0×01, it means that the service relation type is SVC (Scalable Video Coding).

As shown in FIG. 7, in the present exemplary embodiment, signaling is performed on a 3D image service related to a corresponding service by using the linkage descriptor linking the corresponding service and the relevant service on the SDT of the SI.

Namely, signaling is performed on the 3D image service related to the 2D image by providing service ID information (service_id) of a service providing the relevant 3D image service and relation type information by using the linkage descriptor. Also, in FIG. 7, the PID information of each service is obtained by linking the "service_id" field in the SDT and the "program_number" field in the PMT.

A method for providing linkage information regarding a 3D image service related to a 2D image in the DVB type digital broadcast according to an exemplary embodiment of the present invention will now be described in more detail.

First, information regarding a service having a service type of a 2D image is obtained from a service loop in the SDT and stored. In FIG. 7, it is noted that a service having a service ID 2 (i.e., "service_id"=2) has a service type 0×1B (i.e., "service_type"=0×1B), namely, a service type of a 2D image. Meanwhile, PID (Packet Identifier) information regarding a service having the service ID 2 (i.e., "service_id"=2) is recognized through the PMT having a "program_number" field value of 2 (i.e., "program_number"=2).

Also, information regarding a service having a 3D service type is obtained from the service loop in the SDT and stored. In FIG. 7, it is noted that a service having a service ID 3 (i.e., "service_id"=3) has a service type 0×1C (i.e., "service_type"=0×1C), namely, a service type of a 3D image. Meanwhile, PID (Packet Identifier) information regarding a service having the service ID 3 (i.e., "service_id"=3) is recognized through the PMT having a "program_number" field value of 3 (i.e., "program_number"=3).

Thereafter, service ID (service_id) information regarding a 3D image service connected to the 2D image service is recognized through the linkage descriptor. As shown in FIG. 7, it is noted that a service of a 2D image having the service ID 2 (namely, "service_id"=2 and "service_type"=0×1B) is linked to a service of a 3D image having a service ID 3 (namely, "service_id"=3 and "service_type"=0×1C) through the linkage descriptor.

A decoding operation and a display output with respect to an audio stream, a base view video stream, and an extended view video stream included in each service will be described in detail later.

In this manner, in the present exemplary embodiment, the linkage information of the 3D image service related to the 2D image can be provided through the SDT of the SI and the PMT of the PSI in the DVB type digital broadcast.

Figure 8:
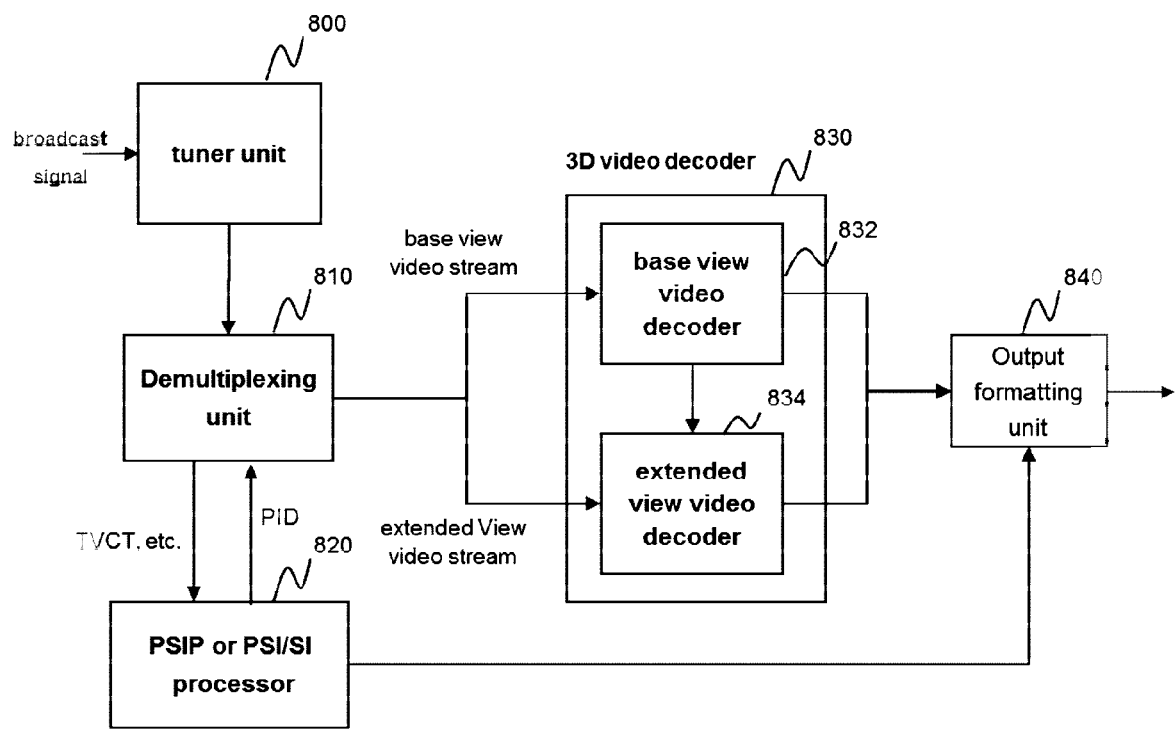
FIG. 8 is a schematic block diagram showing the configuration of a digital broadcast receiving apparatus according to an exemplary embodiment of the present invention.

The configuration and operation of the digital broadcast receiving apparatus according to an exemplary embodiment of the present invention will now be described with reference to FIG. 8. FIG. 8 is a schematic block diagram of the digital broadcast receiving apparatus according to an exemplary embodiment of the present invention.

As shown in FIG. 8, the digital broadcast receiving apparatus according to an exemplary embodiment of the present invention includes a tuner unit 800 configured to receive a digital broadcast signal, detect the received signal and correct an error to generate a transport stream, a demultiplexing unit 810 configured to filter and parse the transport stream, a PSIP or PSI/SI processor 820 configured to extract information (referred to as '3D linkage information', hereinafter) regarding a 3D image channel providing a 3D image service related to a 2D image received from the demultiplexing unit 810, a 3D video decoder 830 including a base view video decoder 832 for decoding an elementary stream with respect to a base view video and an extended view video decoder 834 for decoding an elementary stream with respect to an extended view video, and an output formatting unit 840 configured to format the decoded extended view video stream and the decoded base view video stream according to a stereoscopic image display output.

The operation of the digital broadcast receiving apparatus configured as described above will now be described in detail.

First, the tuner unit 800 receives a digital broadcast signal, demodulates the received signal, detects the demodulated signal, and corrects an error of the signal to generate a transport stream. In general, image data transmitted by the digital broadcast signal is formatted in the form of a transport stream of an MPEG (Moving Picture Experts Group) system.

The demultiplexing unit 810 filters and parses the transport stream to filter out a desired packet, and generates an elementary stream with respect to image information and audio information.

The PSIP or PSI/SI processor 820 receives table information such as a PMT (Program Map Table), a TVCT (Terrestrial Virtual Channel Table), an SDT (Service Description Table), or the like, and extracts information regarding a 3D image channel providing a 3D image service, namely, 3D service information, related to a 2D image.

The 3D video decoder 830 decodes an elementary stream including a base view video stream and an elementary stream including an extended view video stream to generate a base view video stream, an extended view video stream, and the like. Here, the elementary stream including the base view video stream is decoded by the base view video decoder 832, and the elementary stream including the extended view video stream is decoded by the extended view video decoder 834.

When the extended view video stream is coded by the MVC (Multiview Video Codec), decoding on the extended view video stream is performed by using a corresponding base view video frame as a reference. Thus, decoding cannot be performed on the extended view video stream until the base view video frame is transferred to the extended view video decoder 834.

For this reason, although the decoding operation on the base view video stream has been completed, a video stream input to the output formatting unit 840 may be delayed until when the decoding operation on the extended view video stream is completed.

Meanwhile, when the extended view video stream is coded through MPEG-4 AVC (Advanced Video Coding), the extended view video decoder 834 may separately operate from the base view video decoder 832, so the decoding operation can be performed in parallel. Thus, in this case, such delay in input of the video stream to the output formatting unit 840 can be reduced.

Thereafter, the output formatting unit 840 formats the base view video stream and the extended view video stream according to a stereoscopic image display output based on the position information regarding the extended view video stream according to the stereoscopic display output and then transmits the same.

In case of the a stereoscopic display, in order to format the base view video stream and the extended view video stream according to the stereoscopic display output, the output formatting unit 840 uses the position information of the extended view video stream. In this case, the "right_left_flag" field of the extended view video stream may be used as the location information.

For example, when the "right_left_flag" field value of the extended view video stream is 0, the position of the extended view video stream is in the leftward direction of the base view video stream, so the output formatting unit 840 formats the extended view video stream such that it is output to the left video plane and the base view video stream such that it is output to the right video plane.

Meanwhile, when the "right_left_flag" field value of the extended view video stream is 1, the position of the extended view video stream is in the rightward direction of the base view video stream, so the output formatting unit 840 formats the extended view video stream such that it is output to the right video plane and the base view video stream such that it is output to the left video plane.

In this manner, the digital broadcast receiving apparatus according to an exemplary embodiment of the present invention can check and process the information regarding the 3D image channel related to the 2D image, and thus, when the user selects a 3D image service with respect to a 2D image, the user can quickly move to the corresponding 3D image channel, thus improving user convenience.

Hereinafter, a method for checking and processing information regarding a 3D image service information related to a 2D image in ATSC type and DVB type schemes by the digital broadcast receiving apparatus according to an exemplary embodiment of the present invention will now be described with reference to FIGS. 9 and 10.

Figure 9:
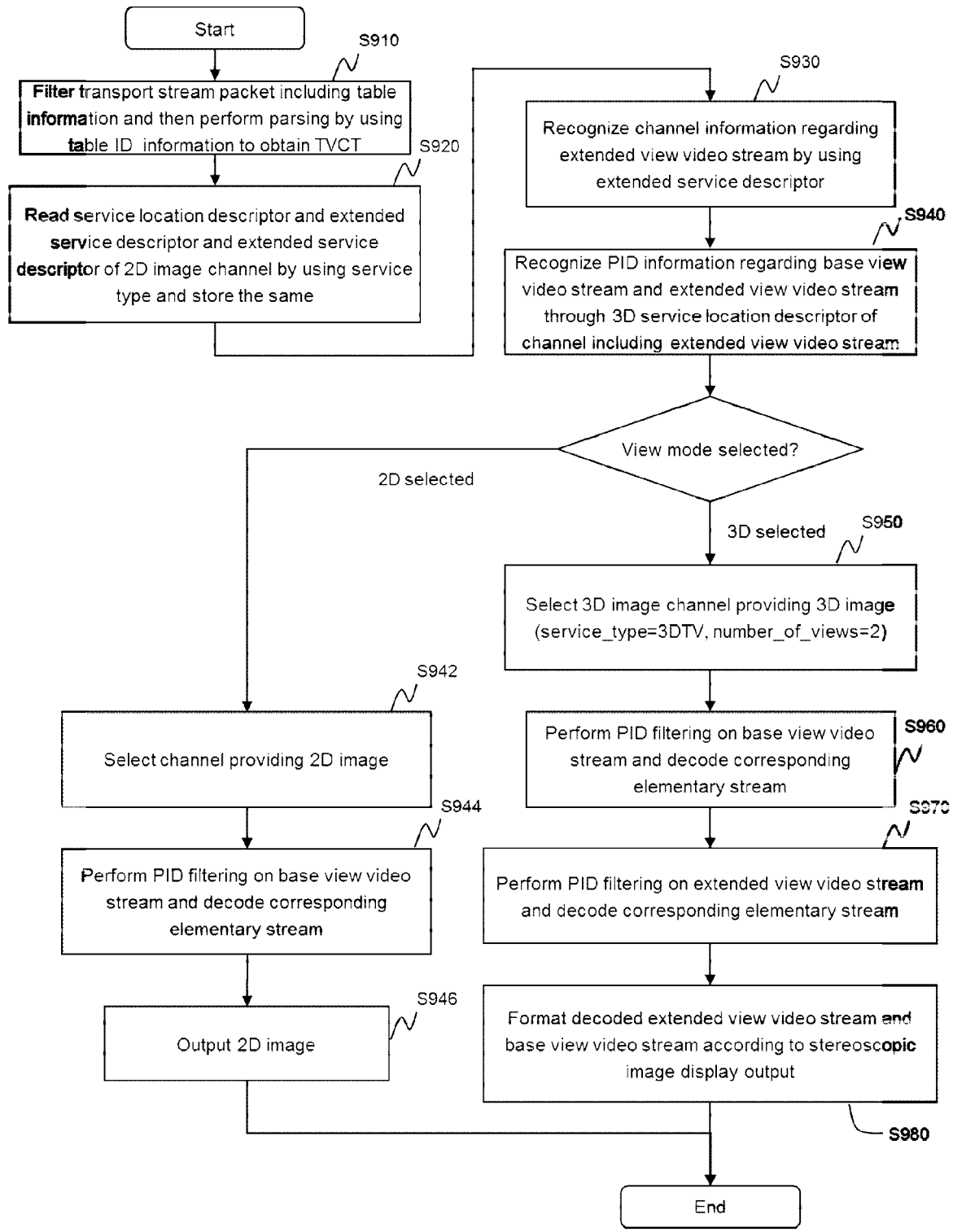
FIG. 9 is a flow chart illustrating the process of a method for checking and processing information regarding a 3D image channel by the digital broadcast receiving apparatus when the information regarding the 3D image channel related to a 2D image channel is provided through the TVCT (Terrestrial Virtual Channel Table) of the PSIP (Program and System Information Protocol) used in an ATSC type digital broadcast according to an exemplary embodiment of the present invention.

FIG. 9 is a flow chart illustrating the process of a method for checking and processing information regarding a 3D image channel by the digital broadcast receiving apparatus when the information regarding the 3D image channel related to a 2D image channel is provided through the TVCT (Terrestrial Virtual Channel Table) of the PSIP (Program and System Information Protocol) used in the ATSC type digital broadcast according to an exemplary embodiment of the present invention.

First, with respect to a transport stream output from the tuner unit 800, the demultiplexing unit 810 filters transport stream packets that include table information and then parses section data by using table ID information (table_id) to obtain a TVCT (step S910). In this case, the PID of the transport stream packet including the TVCT is set to have a value of 0x1FFB.

The PSIP or PSI/SI processor 820 reads a service location descriptor and an extended service descriptor of a 2D image channel by using service type (service_type) information from the TVCT, and stores the descriptors (step S920).

Also, the PSIP or PSI/SI processor 820 recognizes channel information regarding the extended view video stream by using the extended service descriptor (step S930). Selectively, after the PSIP or PSI/SI processor 820 recognizes the channel information regarding the extended view video stream, it may indicate that a 3D image service can be available over the corresponding 2D image.

The PSIP or PSI/SI processor 820 recognizes packet identifier (PID) information regarding the base view video stream and the extended view video stream by using the 3D service location descriptor of the channel that includes the extended view video stream (step S940).

When a selection of a 2D image service is input by the user, a 2D image channel providing a 2D image is selected (step S942).

The demultiplexing unit 819 performs PID filtering on the base view video stream by using the PID information of the base view video stream, and the base view video decoder 832 of the 3D video decoder 830 decodes a corresponding elementary stream and then transmits the decoded elementary stream (step S944).

Thereafter, the decoded base view video stream is displayed as a 2D image (step S946).

Meanwhile, when a selection of a 3D image service is input by the user, a 3D image channel with respect to a 2D image is selected (step S950). If it is assumed that the corresponding 3D image channel provides a 3D stereoscopic image, a service type (service_type) of the channel is a 3DTV (namely, "service_type"=3DTV) and the number of streams (number_of_views) is two (namely, a base view video stream and one extended view video stream).

The demultiplexing unit 810 performs PID filtering on the base view video stream by using the PID information of the base view video stream, and the base view video decoder 832 of the 3D video decoder 830 decodes a corresponding elementary stream (step S960).

Also, the demultiplexing unit 810 performs PID filtering on the extended view video stream by using the PID information regarding the extended view video stream, and the extended view video decoder 834 of the 3D video decoder 830 decodes the corresponding elementary stream (step S970).

Thereafter, the output formatting unit 840 formats the decoded extended view video stream and the base view video stream according to a stereoscopic display output, and then outputs the formatted streams (step S980).

In this manner, in the digital broadcast receiving apparatus according to an exemplary embodiment of the present invention, when 3D image service information related to a 2D image is provided through the PSIP and TVCT, the 3D image service information can be checked and processed, thus providing an integrated service of a 2D image and a 3D image.

Figure 10:
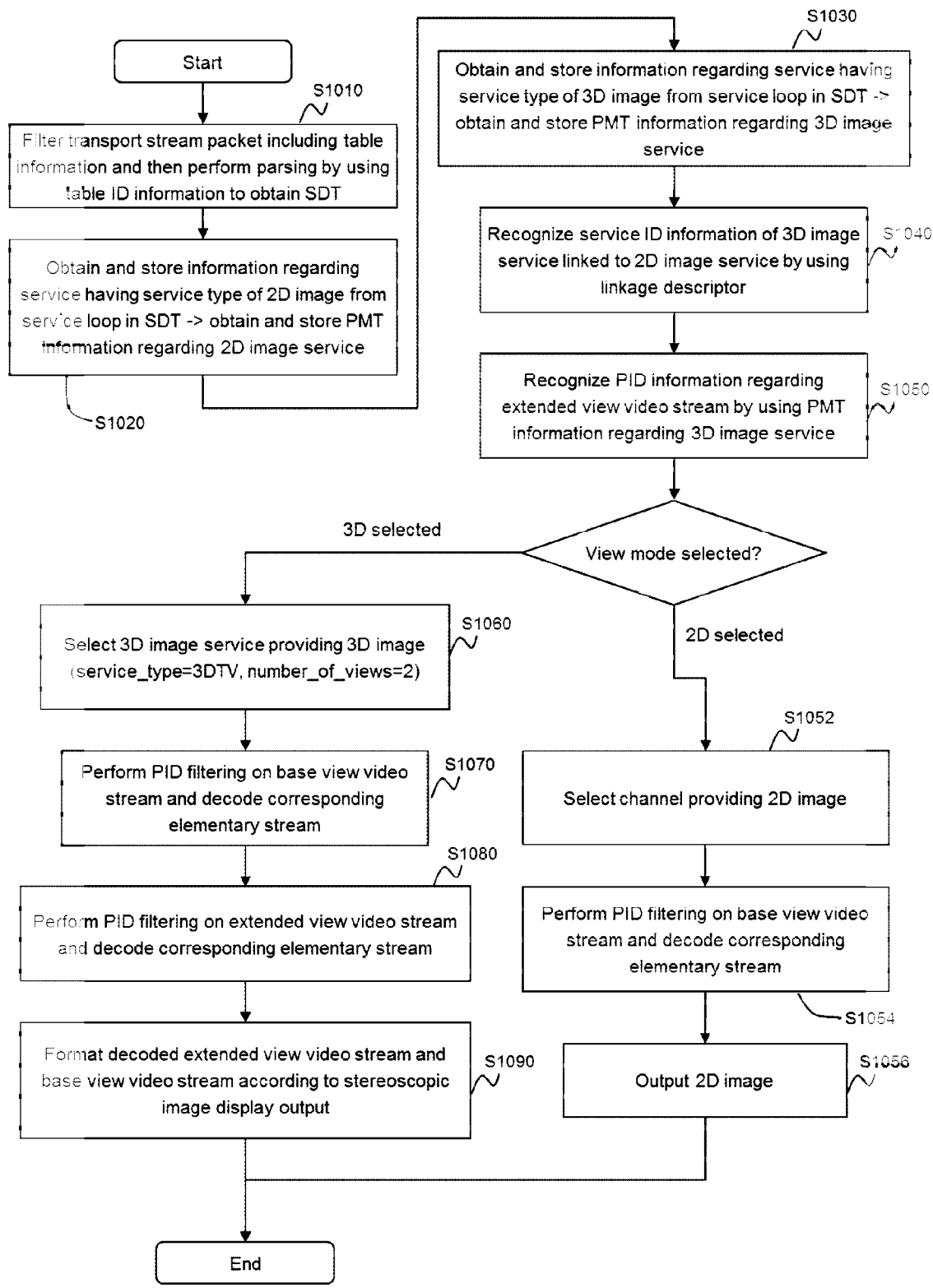
FIG. 10 is a flow chart illustrating the process of a method for checking and processing information regarding a 3D image service by the digital broadcast receiving apparatus when information regarding the 3D image service with respect to a 2D image service is provided through the SDT (Service Description Table) of the SI (Service Information) and the PMT (Program Map Table) of the PSI (Program Specific Information) in the DVB type digital broadcast according to an exemplary embodiment of the present invention.

FIG. 10 is a flow chart illustrating the process of a method for checking and processing information regarding a 3D image service by the digital broadcast receiving apparatus when information regarding the 3D image service with respect to a 2D image is provided through the SDT (Service Description Table) of the SI (Service Information) and the PMT (Program Map Table) of the PSI (Program Specific Information) in the DVB type digital broadcast according to an exemplary embodiment of the present invention.

First, with respect to a transport stream output from the tuner unit 800, the demultiplexing unit 810 filters transport stream packets that include table information and then parses section data by using table ID information (table_id) to obtain an SDT (step S1010).

The PSIP or PSI/SI processor 820 obtains information regarding a service having a service type of a 2D image in the service descriptor from the service loop of the SDT and stores the obtained information (step S1020). In the present exemplary embodiment, through this process, PMT information regarding the 2D image service is obtained and stored.

Also, the PSIP or PSI/SI processor 820 obtains information regarding a service having a 3D service type from the service loop of the SDT and stores the obtained information (step S1030). In the present exemplary embodiment, through this process, PMT information regarding the 3D image service is obtained and stored.

Meanwhile, the PSIP or PSI/SI processor 820 recognizes service ID information (service_id) regarding the 3D image service connected to the 2D image service by using the linkage descriptor (step S1040). Selectively, after the PSIP or PSI/SI processor 820 recognizes the service ID information (service_id) regarding the 3D image service, it may display the availability of the 3D image service with respect to the corresponding 2D image.

Thereafter, the PSIP or PSI/SI processor 820 recognizes the PID information regarding the extended view video stream by using the PMT information regarding the 3D image service which has been previously stored (step S1050).

When a selection of the 2D image service is input by the user, the 2D image service providing a 2D image is selected (step S1052).

Next, the demultiplexing unit 810 performs PID filtering on the base view video stream by using the PDI information of the base view video stream, and the base view video decoder 832 of the 3D video decoder 830 decodes the corresponding elementary stream and then transmits the decoded elementary stream (step S1054).

Thereafter, the decoded base view video stream is displayed as a 2D image (step S1056).

Meanwhile, when a selection of a 3D image service is input by the user, the 3D image service related to the 2D image service is selected (step S1060). When the corresponding 3D image service provides a 3D stereoscopic image, the service type (service_type) is 3DTV (i.e., "service_type"=3DTV) and the number of streams (number of views) is 2 (namely, one base view video stream and one extended view video stream).

Thereafter, the demultiplexing unit 810 performs PID filtering on the base view video stream by using the PID information of the base view video stream, and the base view video decoder 832 of the 3D video decoder 830 performs decoding on the corresponding elementary stream (step S1070).

Also, the demultiplexing unit 810 performs PID filtering on the extended view video stream, and the extended view video decoder 834 of the 3D video decoder 830 performs decoding on the corresponding elementary stream (step S1080).

Thereafter, the output formatting unit 840 formats the decoded extended view video stream and the extended base view video stream according to a stereoscopic image display, and then transmits the same (step S1090).

In this manner, in the digital broadcast receiving apparatus according to an exemplary embodiment of the present invention, when 3D image service information related to a 2D image is provided through the SDT Service Description Table) of the SI (Service Information) and the PMT (Program Map Table) of the PSI (Program Specific Information), the 3D image service information can be checked and processed, thus providing an integrated service of 2D and 3D images.

A method for performing signaling on channel information providing a related 2D image service by applying an additional descriptor to a 3D image channel broadcasting 3D image according to a different exemplary embodiment will now be described.

First, the configuration of a 3D service location descriptor used to perform signaling on information regarding a 2D image channel related to a 3D image channel will be described in detail with reference to the accompanying drawings.

FIG. 11 is a view showing a 3D service location descriptor providing information regarding a 2D image channel related to a 3D image channel through the TVCT of the PSIP according to an exemplary embodiment of the present invention.

Each field constituting the 3D service location descriptor illustrated in FIG. 11 according to an exemplary embodiment of the present invention will now be described. For a simple and clear description of the present invention, English expressions of the fields constituting a syntax will be used as it is and discriminated by using double quotation marks.

"descriptor_tag" is a field for discriminating the descriptor, and has a value of 8 bits.

"descriptor_length" indicates the overall length of a following field by the number of bits, and has a value of 8 bits.

"reserved" is a field which is not currently used in a system but is likely to be used in the future. It is filled with 0 according to the number of bits thereof until such is newly defined.

"PCR_PID" indicates a packet identifier (PID) of a packet including timing information of a program, and has a value of 13 bits.

"base_view_major_channel_number" indicates "major_channel_number" with respect to a virtual channel providing a 2D image service, and has a value of 10 bits. The "major_channel_number" indicates a major channel number related to a virtual channel, and is used as a user reference number with respect to the corresponding virtual channel.

"base_view_minor_channel_number" indicates "minor_channel_number" with respect to a virtual channel providing a 2D image service, and has a value of 10 bits. The "minor_channel_number" is used together with the "major_channel_number" as channel numbers of two parts.

"base_view_source_id" indicates "source_id" with respect to a virtual channel providing a 2D image service, and has a value of 16 bits. The "source_id" indicates a programming source connected to the corresponding virtual channel, and in this case, the source refers to a single particular source such as video, text, data, or audio.

"base_view_channel_TSID" indicates "channel_TSID" with respect to a virtual channel providing a 2D image service, and has a value of 16 bits.

The "channel_TSID" designates an ID value of an MPEG-2 transport stream connected to an MPEG-2 transport stream used as a reference (or basis) of a virtual channel.

"base_view_program_number" indicates "program_number" with respect to a virtual channel providing a 2D image service, and has a value of 16 bits. The "program_number" is to link a program number defined in a PAT (Program Association Table) and a PMT (Program Map Table) of the MPEG-2 system to a virtual channel "number_of_views" indicates the number of image streams which can be received through a corresponding channel, and has a value of 7 bits.

"stream_type" indicates the type of an elementary stream, and has a value of 8 bits. For example, when the value of "stream_type" is 0×20, it can be noted that a corresponding elementary stream has been coded by the MVC (Multiview Video Codec).

"format_identifier" checks an entity providing the value of "stream_type", and has a value of 32 bits.

"length_of_details" indicates (in units of bytes) the length of "stream_info_details" that comes later, and has a value of 8 bits.

"extended_service_type" indicates a service type (service_type) of a virtual channel used to provide a 3D image service, and has a value of 8 bits.

In the present exemplary embodiment, whether a service provided by a corresponding virtual channel is a 3D stereoscopic image or a 3D multi-view image can be indicated by the value of this field.

"elementary_PID" includes a packet identifier (PD) of an elementary stream, and has a value of 13 bits.

"priority_id" provides information regarding which of receivable 3D image channels is to be selected when a support function with respect to a multiview image is limited, and has a value of 7 bits.

When the number of view streams is greater than the number which can be output by the digital broadcast receiving apparatus, a virtual channel to be decided and output can be determined by using the "priority_id". For example, in case of a digital broadcast receiving apparatus having a stereoscopic display function, an image stream having "priority_id" of 0 and 1.

Different values of "priority_id" are granted to every image stream, so that a repeated value cannot be generated. The "priority_id" value with respect to a base view video stream is set to be 0. In a different exemplary embodiment, "priority_id" may be omitted, and in this case, the priority with respect to image streams is determined to be the order in the 3D service location descriptor.

"left_right_flag" indicates whether or not the position of an extended view video stream is in a rightward direction or a leftward direction based on a base view, and has a value of 1 bit. When the position of the extended view video stream is in the leftward direction based on the base view, this field has a value of 0, and when the position of the extended view video stream is in the rightward direction based on the base view, this field has a value of 1.

For example, in case of a stereoscopic display, when "left_right_flag"=1, the extended view video stream is decoded and output to a right video plane in the stereoscopic display output and the base view video stream is output to a left video plane. In case of the base view video stream, this field is disregarded.

"view_position" is indicates by which of left cameras or right cameras in a horizontal direction based on the base view the extended view video stream has been captured, or to which of multi-view planes the extended view video stream is to be output. This field has a value of 7 bits. In case of a stereoscopic display, only two of the left and right video streams are used, so this field is not required to be used.

In the present exemplary embodiment, the position of the extended view video stream or a video plane to which the extended view video stream is to be output can be clearly designated by using the "left_right_flag" and the "view_position".

In this manner, information regarding a 2D image channel related to a corresponding 3D image channel can be provided in the TVCT (Terrestrial Virtual Channel Table) of the PSIP (Program and System Information Protocol) by using the 3D service location descriptor with respect to the 3D image channel.

FIGS. 12 and 13 show examples of constituting the TVCT of the PSIP including the descriptor of FIG. 11.

In FIGS. 12 and 13, signaling is performed on the channel 12-1 of FIG. 3, a 2D image channel using the base view video stream, in the same manner as that of the existing method.

Meanwhile, as shown in FIGS. 12 and 13, information regarding a video stream in a 2D image channel and each channel is provided by using the 3D service location descriptor with respect to the channels 12-2 and 12-3 of FIG. 3, the 3D image channels. The respective fields of the TVCT illustrated in FIGS. 12 and 13 are the same as those in FIG. 4 described above, so a description thereof will be omitted for the sake of brevity.

In FIGS. 12 and 13, the value of a variable is 0 (i.e., i=0), it relates to the channel 12-1, a 2D image channel, and signaling is performed on the channel by using the existing service location descriptor as described above.

Meanwhile, FIG. 12 shows a case in which the value of the variable i is 1 (namely, i=1), in which signaling is performed on a channel 12-2, a first 3D image channel. Namely, with respect to the channel 12-2, i.e., a 3D image channel, information regarding a 2D image channel providing a 2D image with respect to a 3D image is provided, and also, information regarding a base view video stream (namely, j=0) and an extended view video stream #1 (namely, j=1) is provided by using the 3D service location descriptor according to the present exemplary embodiment.

FIG. 13 shows a case in which the value of the variable i is 2 (namely, i=2), in which signaling is performed in channel 12-3, a second 3D image channel. Namely, with respect to the channel 12-3, i.e., a 3D image channel, information regarding a 2D image channel providing a 2D image with respect to a 3D image is provided, and information regarding the base view video stream (namely, j=0), the extended view video stream #1 (namely, j=1), the extended view video stream #0 (namely, j=2), and the extended view video stream #3 (namely, j=3) are provided by using the 3D service location descriptor according to the present exemplary embodiment.

In this manner, since the information of the 2D image channel related to the 3D image channel is provided through the TVCT (Terrestrial Virtual Channel Table) of the PSIP (Program and System Information Protocol) in the ATSC type digital broadcast, the integrated service with respect to 2D and 3D images can be provided.

So far, the method for providing the information regarding a 2D image channel related to a 3D image channel according to an exemplary embodiment of the present invention in the ATSC scheme, a digital broadcast scheme, which is largely used in North America has been described. Hereinafter, a method for providing information regarding a 2D image service related to a 3D image service according to an exemplary embodiment of the present invention in the DVB scheme, a digital broadcast scheme, largely used in Europe will now be described.

Figure 14:
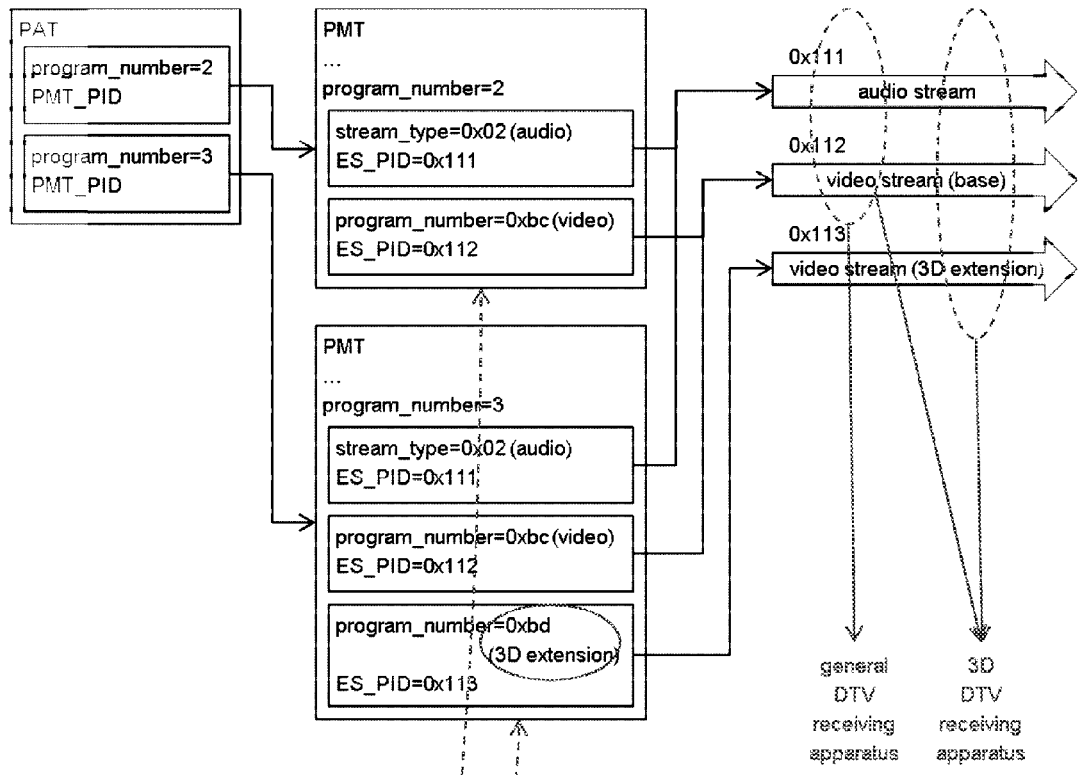
FIG. 14 shows a method for providing information regarding a 2D image service related to a 3D image service through the SDT (Service Description Table) of SI (Service Information) and the PMT (Program Map Table) of PSI (Program Specific Information) used in the DVB (Digital Video Broadcasting) type digital broadcast.

FIG. 14 shows a method for providing information regarding a 2D image service related to a 3D image service through the SDT (Service Description Table) of the SI (Service Information) and the PMT (Program Map Table) of the PSI (Program Specific Information) used in a DVB (Digital Video Broadcasting) type digital broadcast.

In FIG. 14, the PAT (Program Association Table) is one of the table information included in the PSI (Program Specific Information). Fields illustrated in FIG. 14 are the same as those described above with reference to FIG. 7, so a description thereof will be omitted for the sake of brevity.

As shown in FIG. 14, in the present exemplary embodiment, signaling is performed on a 2D image service related to a corresponding service by using the linkage descriptor linking the corresponding service and the relevant service on the SDT of the SI.

Namely, signaling is performed on the 2D image service related to the 3D image service by providing service ID information (service_id) of a service providing the relevant 3D image service and relation type information by using the linkage descriptor. Also, in FIG. 14, the PID information of each service is obtained by linking the "service_id" field in the SDT and the "program_number" field in the PMT.

A method for providing linkage information regarding a 2D image service related to a 3D image service in the DVB type digital broadcast according to an exemplary embodiment of the present invention will now be described in more detail.

First, information regarding a service having a service type of a 2D image is obtained from a service loop in the SDT and stored. In FIG. 14, it is noted that a service having a service ID 2 (i.e., "service_id"=2) has a service type 0×1B (i.e., "service_type"=0×1B), namely, a service type of a 2D image. Meanwhile, PID (Packet Identifier) information regarding a service having the service ID 2 (i.e., "service_id"=2) is recognized through the PMT having a "program_number" field value of 2 (i.e., "program_number"=2).

Also, information regarding a service having a 3D service type is obtained from the service loop in the SDT and stored. In FIG. 7, it is noted that a service having a service ID 3 (i.e., "service_id"=3) has a service type 0×1C (i.e., "service_type"=0×1C), namely, a service type of a 3D image. Meanwhile, PID (Packet Identifier) information regarding a service having the service ID 3 (i.e., "service_id"=3) is recognized through the PMT having a "program_number" field value of 3 (i.e., "program_number"=3).

Thereafter, service ID (service_id) information regarding a 2D image service connected to the 3D image service is recognized through the linkage descriptor. As shown in FIG. 14, it is noted that a service of a 3D image having the service ID 3 (namely, "service_id"=3 and "service_type"=0×1C) is linked to a service of a 2D image having a service ID 2 (namely, "service_id"=2 and "service_type"=0×1B) through the linkage descriptor.

A decoding operation and a display output with respect to a audio stream, a base view video stream, and an extended view video stream included in each service will be described in detail later.

In this manner, in the present exemplary embodiment, the linkage information of the 2D image service related to the 3D image service can be provided through the SDT of the SI and the PMT of the PSI in the DVB type digital broadcast.

Hereinafter, a method for checking and processing 2D service information related to a 3D image in the ATSC scheme by the digital broadcast receiving apparatus according to an exemplary embodiment of the present invention will now be described with reference to FIG. 15.

Figure 15:
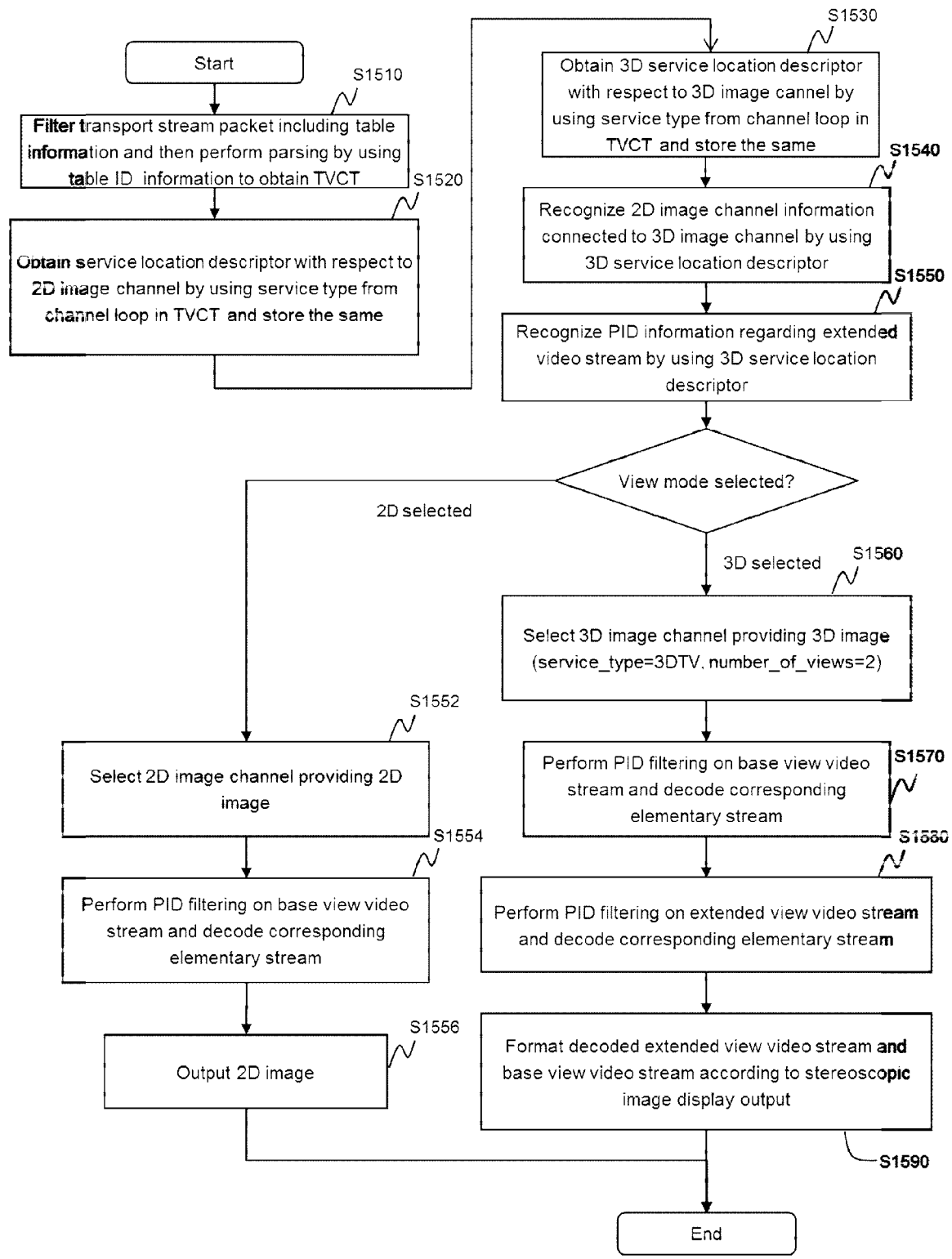
FIG. 15 is a flow chart illustrating the process of a method for checking and processing information regarding a 2D image channel by the digital broadcast receiving apparatus when the information regarding the 2D image channel related to a 3D image channel is provided through the TVCT (Terrestrial Virtual Channel Table) of the PSIP (Program and System Information Protocol) used in an ATSC type digital broadcast according to an exemplary embodiment of the present invention.

FIG. 15 is a flow chart illustrating the process of a method for checking and processing information regarding a 2D image channel by the digital broadcast receiving apparatus when the information regarding the 2D image channel related to a 3D image is provided through the TVCT (Terrestrial Virtual Channel Table) of the PSIP (Program and System Information Protocol) used in an ATSC type digital broadcast according to an exemplary embodiment of the present invention.

First, with respect to a transport stream output from the tuner unit 800, the demultiplexing unit 810 filters transport stream packets that include table information and then parses section data by using table ID information (table_id) to obtain a TVCT (step S1510). In this case, the PID of the transport stream packet including the TVCT is set to have a value of 0×1FFB.

The PSIP or PSI/SI processor 820 obtains a service location descriptor with respect to a 2D image channel having a service type (service_type) of a 2D image from a channel loop in the TVCT and stores the same (step S1520).

Also, PSIP or PSI/SI processor 820 obtains a 3D service location descriptor with respect to a 3D image channel having a service type (service_type) of a 3D image from the channel loop in the TVCT, and stores the same (step S1530).

Also, the PSIP or PSI/SI processor 820 recognizes information regarding the 2D image channel linked to the 3D image channel by using the 3D service location descriptor (step S1540). Selectively, after the PSIP or PSI/SI processor 820 recognizes the information regarding the 2D image channel connected to the 3D image channel, it may display the availability of the 2D image service with respect to the corresponding 3D images.

Also, the PSIP or PSI/SI processor 820 recognizes packet identifier (PID) information regarding an extended view video stream by using the 3D service location descriptor (step S1550).

When a selection with respect to the 2D image service is input by the user, the 2D image channel providing a 2D image is selected (step S1552).

Next, the demultiplexing unit 810 performs PID filtering on the base view video stream by using the PDI information of the base view video stream, and the base view video decoder 832 of the 3D video decoder 830 decodes the corresponding elementary stream and then transmits the decoded elementary stream (step S1554).

Thereafter, the decoded base view video stream is displayed as a 2D image (step S1556).

Meanwhile, when a selection of a 3D image service is input by the user, the 3D image channel providing a 3D image is selected (step S1560). When the corresponding 3D image service provides a 3D stereoscopic image, the service type (service_type) is 3DTV (i.e., "service_type"=3DTV) and the number of streams (number of views) is 2 (namely, one base view video stream and one extended view video stream).

Thereafter, the demultiplexing unit 810 performs PID filtering on the base view video stream by using the PID information of the base view video stream, and the base view video decoder 832 of the 3D video decoder 830 performs decoding on the corresponding elementary stream (step S1570).

Also, the demultiplexing unit 810 performs PID filtering on the extended view video stream, and the extended view video decoder 834 of the 3D video decoder 830 performs decoding on the corresponding elementary stream (step S1580).

Thereafter, the output formatting unit 840 formats the decoded extended view video stream and the extended base view video stream according to a stereoscopic image display, and then transmits the same (step S1590).

In this manner, in the digital broadcast receiving apparatus according to an exemplary embodiment of the present invention, when 2D image service information related to 3D images is provided through the TVCT of the PSIP, the 2D image service information can be checked and processed, thus providing an integrated service of 2D and 3D images.

Figure 16:
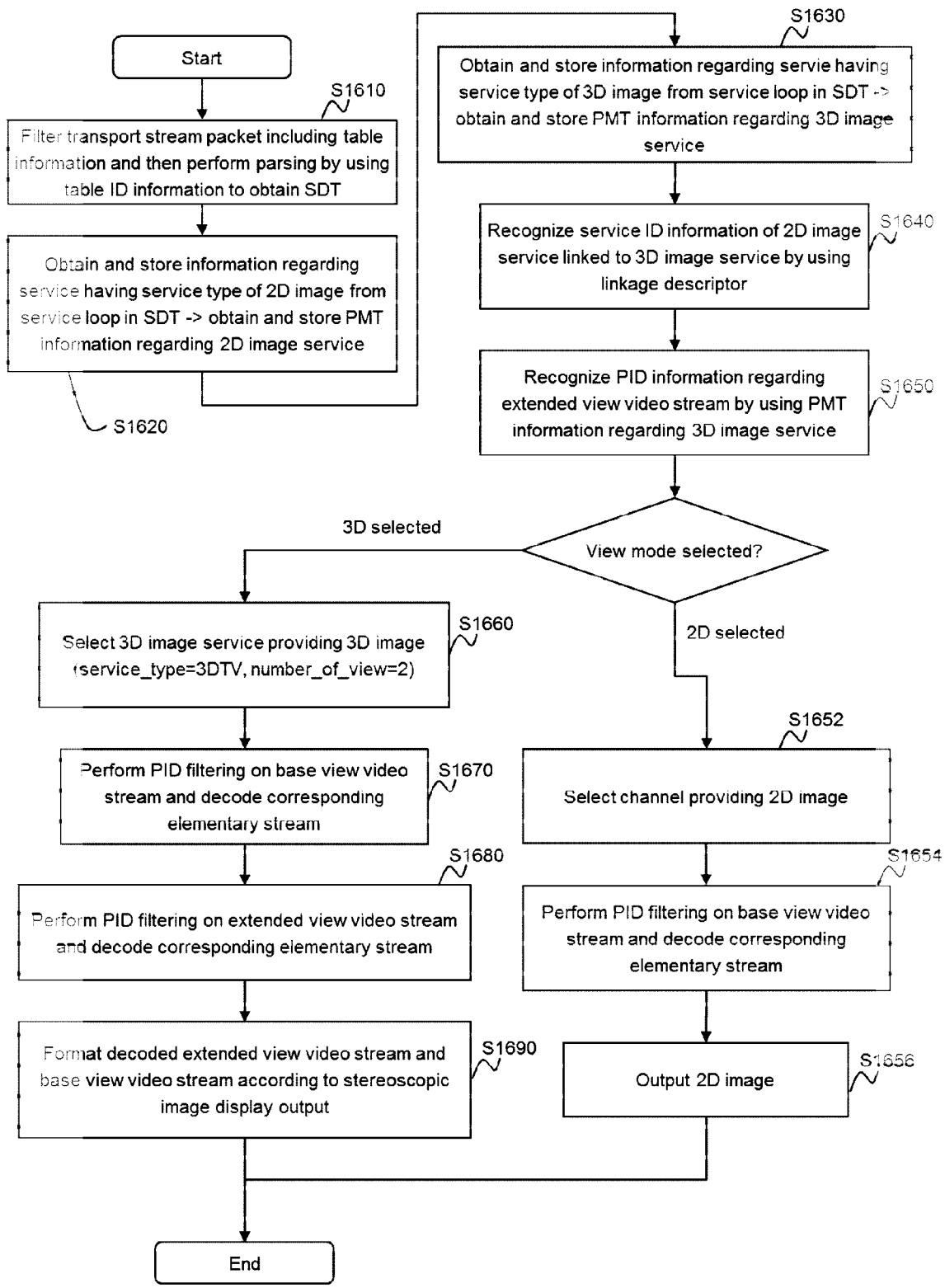
FIG. 16 is a flow chart illustrating the process of a method for checking and processing information regarding a 2D image service by the digital broadcast receiving apparatus when information regarding the 2D image service with respect to a 3D image service is provided through the SDT (Service Description Table) of the SI (Service Information) and the PMT (Program Map Table) of the PSI (Program Specific Information) in the DVB type digital broadcast according to an exemplary embodiment of the present invention.

FIG. 16 is a flow chart illustrating the process of a method for checking and processing information regarding a 2D image service by the digital broadcast receiving apparatus when information regarding the 2D image service with respect to a 3D image is provided through the SDT (Service Description Table) of the SI (Service Information) and the PMT (Program Map Table) of the PSI (Program Specific Information) in the DVB type digital broadcast according to an exemplary embodiment of the present invention.

First, with respect to a transport stream output from the tuner unit 800, the demultiplexing unit 810 filters transport stream packets that include table information and then parses section data by using table ID information (table_id) to obtain an SDT (step S1610).

The PSIP or PSI/SI processor 820 obtains information regarding a service having a service type of a 2D image in the service descriptor from the service loop of the SDT and stores the obtained information (step S1620). In the present exemplary embodiment, through this process, PMT information regarding the 2D image service is obtained and stored.

Also, the PSIP or PSI/SI processor 820 obtains information regarding a service having a 3D service type from the service loop of the SDT and stores the obtained information (step S1630). In the present exemplary embodiment, through this process, PMT information regarding the 3D image service is obtained and stored.

Meanwhile, the PSIP or PSI/SI processor 820 recognizes service ID information (service_id) regarding the 3D image service linked to the 3D image service by using the linkage descriptor (step S1640). Selectively, after the PSIP or PSI/SI processor 820 recognizes the service ID information (service_id) regarding the 2D image service, it may display the availability of the 2D image service with respect to the corresponding 3D image.

Thereafter, the PSIP or PSI/SI processor 820 recognizes the PID information regarding the extended view video stream by using the PMT information regarding the 3D image service which has been previously stored (step S1650).

When a selection of the 2D image service is input by the user, the 2D image service providing a 2D image is selected (step S1652).

Next, the demultiplexing unit 810 performs PID filtering on the base view video stream by using the PDI information of the base view video stream, and the base view video decoder 832 of the 3D video decoder 830 decodes the corresponding elementary stream and then transmits the decoded elementary stream (step S1654).

Thereafter, the decoded base view video stream is displayed as a 2D image (step S1656).

Meanwhile, when a selection of a 3D image service is input by the user, the 3D image service providing a 3D image is selected (step S1660). When the corresponding 3D image service provides a 3D stereoscopic image, the service type (service_type) is 3DTV (i.e., "service_type"=3DTV) and the number of streams (number_of_views) is 2 (namely, one base view video stream and one extended view video stream).

Thereafter, the demultiplexing unit 810 performs PID filtering on the base view video stream by using the PID information of the base view video stream, and the base view video decoder 832 of the 3D video decoder 830 performs decoding on the corresponding elementary stream (step S1670).

Also, the demultiplexing unit 810 performs PID filtering on the extended view video stream, and the extended view video decoder 834 of the 3D video decoder 830 performs decoding on the corresponding elementary stream (step S1680).

Thereafter, the output formatting unit 840 formats the decoded extended view video stream and the extended base view video stream according to a stereoscopic image display, and then transmits the same (step S1690).

In this manner, in the digital broadcast receiving apparatus according to an exemplary embodiment of the present invention, when 2D image service information related to a 3D image is provided through the SDT Service Description Table) of the SI (Service Information) and the PMT (Program Map Table) of the PSI (Program Specific Information), the 2D image service information can be checked and processed, thus providing an integrated service of a 2D image and a 3D image.

As so far described, in the digital broadcast receiving method and apparatus according to the exemplary embodiments of the present invention, the presence of a 3D image service related to a 2D image can be signaled and the presence of a 2D image service related to a 3D image can be also signaled, whereby an integrated service with respect to a 2D image and a 3D image can be provided, and thus, user convenience can be improved.

Various features and concepts described here can be implemented by software, hardware, firmware, middleware, or a combination thereof. For example, a computer program (which is executed by a computer, a processor, a controller, or the like) stored in a computer-executable medium to implement the method and apparatus for receiving a stereoscopic image signal in a digital broadcast may include one or more program code sections performing various operations. Similarly, software tools (which are executed by a computer, a processor, a controller, or the like) stored in a computer-executable medium to implement the method and apparatus for receiving a stereoscopic image signal in a digital broadcast may include part of program codes performing various operations.

The present invention can be applicable to various types of devices, namely, a digital TV, an LCD display device, a personal media player (PMP), a mobile phone, or the like, configured to receive and process a digital broadcast signal.

As the present invention may be embodied in several forms without departing from the spirit or essential characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

The invention claimed is:

1. A method comprising:
receiving one or more broadcast data streams of multi-view video coding (MVC) video for supporting a 3D broadcast service based on the MVC and a plurality of descriptors indicating information associated with the one or more broadcast data streams;
identifying whether the one or more broadcast data streams of the MVC video correspond to a MVC base view stream;
obtaining information related to association between MVC views and left or right eye by using at least one of the descriptors,
said at least one of the descriptors having a value that determines whether the MVC base view stream is associated with left eye view or right eye view;
obtaining information related to positions of the MVC views including at least one MVC extended view stream by using a Program Map Table (PMT),
the information related to positions of MVC views indicating an order of the MVC views in a horizontal direction; and
processing the broadcast data streams using the obtained information related to association between MVC views and left or right eye.

2. The method of claim 1, wherein said at least one of the descriptors includes first and second syntax elements indicating which view, left or right, has been assigned to the MVC base view stream through combination of the first and second syntax elements.

3. The method of claim 1, wherein said at least one of the descriptors is included in in a Program Association Table (PAT) or the PMT.

4. The method of claim 1, wherein the MVC base view stream is displayed on its own for a 2D service.

5. A method comprising:
- encoding one or more broadcast data streams of multi-view video coding (MVC) video for supporting a 3D broadcast service based on the MVC and a plurality of descriptors indicating information associated with the one or more broadcast data streams; and
- transmitting, to a receiver, the one or more broadcast data streams with the descriptors such that the receiver employs at least one of the descriptors to support the 3D broadcast services,
- wherein information that indicates whether the one or more broadcast data streams of the MVC video correspond to a MVC base view stream is transmitted to the receiver,
- wherein at least one of the descriptors has a value that determines whether the MVC base view stream is associated with left eye view or right eye view such that the receiver obtains information related to association between MVC views and left or right eye by using said at least one of the descriptors,
- wherein a Program Map Table (PMT) has information related to positions of the MVC views including at least one MVC extended view stream, and
- wherein the information related to positions of MVC views indicates an order of the MVC views in a horizontal direction.

6. The method of claim 5, wherein said at least one of the descriptors includes first and second syntax elements indicating which view, left or right, has been assigned to the MVC base view stream through combination of the first and second syntax elements.

7. The method of claim 5, wherein said at least one of the descriptors is included in in a Program Association Table (PAT) or the PMT.

8. An apparatus comprising:
- a demultiplexing unit;
- a 3D decoder; and
- a processor, wherein the demultiplexing unit, the 3D decoder, and the processor cooperate with each other to:
- receive one or more broadcast data streams of multi-view video coding (MVC) video for supporting a 3D broadcast service based on multi-view video coding the MVC and a plurality of descriptors indicating information associated with the one or more broadcast data streams;
- identify whether the one or more broadcast data streams of the MVC video correspond to a MVC base view stream;
- obtain information related to association between MVC views and left or right eye by using at least one of the descriptors,
- said at least one of the descriptors having a value that determines the MVC base view stream is associated with left eye view or right eye view;
- obtain information related to positions of the MVC views including at least one MVC extended view stream by using a Program Map Table PMT,
- the information related to positions of MVC views indicating an order of the MVC views in a horizontal direction; and
- process the broadcast data streams using the obtained information related to association between MVC views and left or right eye.

9. The apparatus of claim 8, wherein said at least one of the descriptors includes first and second syntax elements indicating which view, left or right, has been assigned to the MVC base view stream through combination of the first and second syntax elements.

\* \* \* \* \*